United States Patent
Shi et al.

(10) Patent No.: US 11,810,271 B2
(45) Date of Patent: Nov. 7, 2023

(54) DOMAIN SPECIFIC IMAGE QUALITY ASSESSMENT

(71) Applicant: Align Technology, Inc., San Jose, CA (US)

(72) Inventors: Chao Shi, Morrisville, NC (US); Yingjie Li, Cary, NC (US); Chad Clayton Brown, Cary, NC (US); Christopher E. Cramer, Durham, NC (US)

(73) Assignee: Align Technology, Inc., San Jose, CA (US)

( * ) Notice: Subject to any disclaimer, the term of this patent is extended or adjusted under 35 U.S.C. 154(b) by 413 days.

(21) Appl. No.: 17/111,264

(22) Filed: Dec. 3, 2020

(65) Prior Publication Data

US 2021/0174477 A1  Jun. 10, 2021

Related U.S. Application Data

(60) Provisional application No. 62/943,749, filed on Dec. 4, 2019.

(51) Int. Cl.
*G06T 5/00* (2006.01)
*G06N 20/00* (2019.01)
(Continued)

(52) U.S. Cl.
CPC .............. *G06T 5/003* (2013.01); *G06N 20/00* (2019.01); *G06T 11/20* (2013.01); *G06V 10/993* (2022.01);
(Continued)

(58) Field of Classification Search
CPC ..... G06T 5/003; G06T 11/20; G06T 2210/12; G06T 2207/10024; G06T 2207/20081;
(Continued)

(56) References Cited

U.S. PATENT DOCUMENTS

| | | | | |
|---|---|---|---|---|
| 8,902,326 B2 * | 12/2014 | Ciuc | ................... | G06V 40/165 |
| | | | | 348/222.1 |
| 9,639,742 B2 * | 5/2017 | Lee | ...................... | G06V 40/174 |
| | | (Continued) | | |

FOREIGN PATENT DOCUMENTS

| | | | | |
|---|---|---|---|---|
| CA | 2773865 A1 * | 10/2012 | ........... | H04N 5/2226 |
| CA | 2692667 C * | 3/2014 | ............. | G06T 11/60 |
| | (Continued) | | | |

OTHER PUBLICATIONS

Pech-Pacheco, J. L. et al. "Diatom autofocusing in brightfield microscopy: a comparative study"; Proceedings of 15th International Conference on Pattern Recognition, Sep. 2020, pp. 314-317, vol. 3, IEEE.

(Continued)

*Primary Examiner* — Mahendra R Patel
(74) *Attorney, Agent, or Firm* — Lowenstein Sandler LLP

(57) ABSTRACT

In a technique to assess the blurriness of an image, an image of a face is received, the image including a depiction of lips. A processing device determines a region of interest in the image, wherein the region of interest comprises an area inside of the lips. The processing device applies a focus operator to the pixels within the region of interest, and calculates a sharpness metric for the region of interest using an output of the focus operator. The processing device determines whether the sharpness metric satisfies a sharpness criterion, and one or more additional operations are performed responsive to determining that the sharpness metric satisfies the sharpness criterion.

29 Claims, 8 Drawing Sheets

(51) Int. Cl.
*G06T 11/20* (2006.01)
*G06V 40/16* (2022.01)
*G06V 10/98* (2022.01)

(52) U.S. Cl.
CPC .......... *G06V 40/165* (2022.01); *G06V 40/166* (2022.01); *G06T 2210/12* (2013.01)

(58) Field of Classification Search
CPC . G06T 2207/20084; G06T 2207/30168; G06T 2207/30201; G06T 5/40; G06T 7/0002; G06N 20/00; G06N 3/045; G06N 3/047; G06N 3/084; G06V 10/993; G06V 40/165; G06V 40/166
USPC ........................................................ 382/255
See application file for complete search history.

(56) References Cited

U.S. PATENT DOCUMENTS

| | | | |
|---|---|---|---|
| 9,916,538 B2* | 3/2018 | Zadeh | A61B 5/165 |
| 11,089,105 B1* | 8/2021 | Karumbunathan | G06F 3/065 |
| 2011/0026835 A1* | 2/2011 | Ptucha | G06F 16/583 |
| | | | 382/209 |
| 2011/0029635 A1* | 2/2011 | Shkurko | G06T 11/60 |
| | | | 348/E5.022 |
| 2011/0029914 A1* | 2/2011 | Whitby | G06T 11/60 |
| | | | 345/619 |
| 2011/0157226 A1* | 6/2011 | Ptucha | G06T 11/60 |
| | | | 345/638 |
| 2013/0101231 A1* | 4/2013 | Cok | G06F 16/51 |
| | | | 382/224 |
| 2013/0301934 A1* | 11/2013 | Cok | G11B 27/034 |
| | | | 382/218 |
| 2014/0079297 A1* | 3/2014 | Tadayon | G06V 40/172 |
| | | | 382/118 |
| 2018/0092574 A1* | 4/2018 | Tzvieli | A61B 5/6803 |
| 2018/0103903 A1* | 4/2018 | Tzvieli | G06F 18/00 |
| 2018/0204111 A1* | 7/2018 | Zadeh | G06V 10/764 |
| 2019/0313915 A1* | 10/2019 | Tzvieli | G01J 5/12 |
| 2020/0138467 A1* | 5/2020 | Knowlton | A61B 18/1487 |

FOREIGN PATENT DOCUMENTS

| | | | | |
|---|---|---|---|---|
| CN | 109863502 A | * | 6/2019 | ............. A61B 5/163 |
| SE | 534551 C2 | * | 10/2011 | ......... G06F 3/04845 |

OTHER PUBLICATIONS

Pertuz, S. et al. "Analysis of focus measure operators for shape-from-focus"; Pattern Recognition, May 2013, pp. 1415-1432; vol. 46.

* cited by examiner

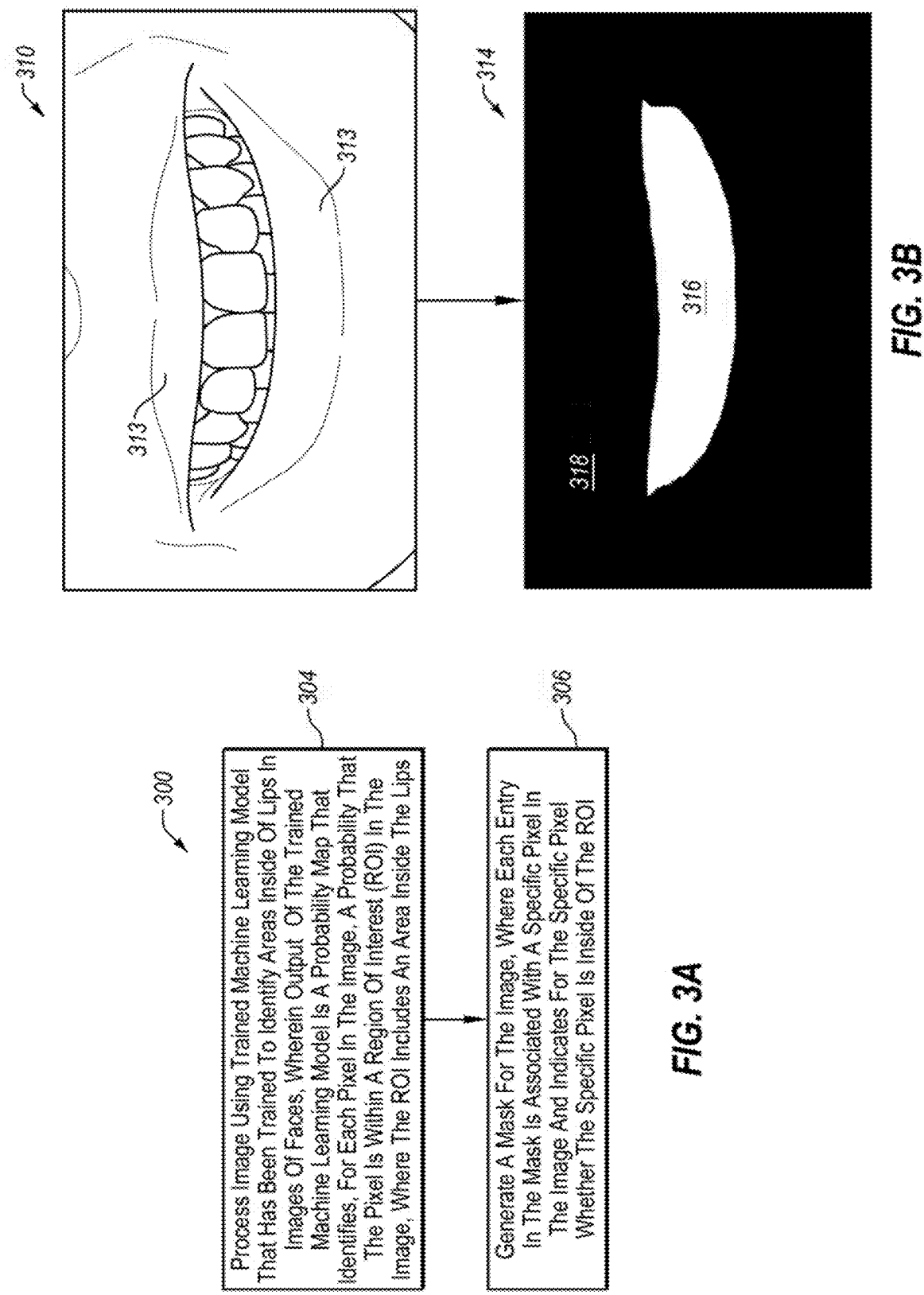

DOMAIN SPECIFIC IMAGE QUALITY ASSESSMENT

RELATED APPLICATIONS

This patent application claims the benefit under 35 U.S.C. § 119(e) of U.S. Provisional Application No. 62/943,749, filed Dec. 4, 2019, which is herein incorporated by reference.

TECHNICAL FIELD

Embodiments of the present disclosure relate to the field of image processing and, in particular, to improved techniques of image quality assessment on images associated with specific domains and/or applications.

BACKGROUND

Image processing is performed on images for many different purposes. In many instances, images that are of poor image quality (e.g., images that are blurry) are unsuitable for use. One significant factor in image quality is the amount of blurring of the image. Traditional techniques for measuring the blurriness of an image are computationally inefficient and/or do not provide sufficient accuracy for many applications.

SUMMARY

Some example embodiments are summarized and described. It should be understood that the present disclosure is not limited to these example embodiments.

In a first example, a method includes receiving an image of a face of a patient, the image including a depiction of lips of the patient. The method further includes determining a region of interest in the image, wherein the region of interest comprises an area inside of the lips. The method further includes applying a focus operator to the pixels within the region of interest. The method further includes calculating a sharpness metric for the region of interest using an output of the focus operator, wherein data for pixels inside of the region of interest is used to calculate the sharpness metric, and wherein data for pixels of a second region that is outside of the region of interest is not used to calculate the sharpness metric. The method further includes determining whether the sharpness metric satisfies a sharpness criterion and performing one or more additional operations responsive to determining that the sharpness metric satisfies the sharpness criterion.

A second example may extend the first example. In the second example, determining the region of interest comprises processing the image using a trained machine learning model that has been trained to identify areas inside of lips in images of faces, wherein an output of the trained machine learning model is a probability map that identifies, for each pixel in the image, a probability that the pixel is within the region of interest; and generating a mask for the image of the patient, wherein each entry in the mask is associated with a specific pixel in the image and indicates for the specific pixel whether the specific pixel is inside of the region of interest or is outside of the region of interest.

A third example may extend the first or second example. In the third example, the trained machine learning model is an artificial neural network.

A fourth example may extend any of the first through third examples. In the fourth example, determining the region of interest comprises associating a bounding shape with the lips depicted in the image using a trained machine learning model, wherein the bounding shape comprises an object bounding the lips of the patient; determining, for each pixel in the image, whether the pixel is inside of the bounding shape or outside of the bounding shape, wherein pixels inside of the bounding shape are associated with the region of interest, and wherein pixels outside of the bounding shape are associated with the second region; and generating a mask for the image of the patient, wherein each entry in the mask is associated with a specific pixel in the image and indicates for the specific pixel whether the specific pixel is associated with the region of interest inside of the bounding shape or the second region outside of the bounding shape.

A fifth example may extend the fourth example. In the fifth example, the image is a two-dimensional image and the bounding shape is a rectangular bounding box or an oval bounding shape.

A sixth example may extend the fourth or fifth example. In the sixth example, performing the one or more additional operations comprises determining a post-treatment dentition of the patient; determining a depiction of a new smile of the patient, wherein the post-treatment dentition is reflected in the new smile; and generating a modified version of the image, wherein the region of interest is replaced with the depiction of the new smile of the patient in the modified version of the image.

A seventh example may extend any of the first through sixth examples. In the seventh example, applying the focus operator comprises applying a Gaussian filter to the pixels within the region of interest and applying a Laplacian filter to an output of the Gaussian filter.

An eighth example may extend the seventh example. In the eighth example, calculating the sharpness metric comprises calculating a variance based on an output of the Laplacian filter.

A ninth example may extend the seventh or eighth example. In the seventh example, a sigma of the Gaussian filter is fixed and the method further comprises performing at least one of cropping the image or resizing the image to cause a size of the region of interest to be within a predetermined size range prior to applying the focus operator.

A tenth example may extend any of the first through ninth examples. In the tenth example, applying the focus operator to the pixels within the region of interest comprises applying the focus operator only to the pixels within the region of interest.

An eleventh example may extend any of the first through tenth examples. In the eleventh example, the method further comprises converting pixels within the region of interest to grayscale prior to applying the focus operator to the pixels within the region of interest.

A twelfth example may extend any of the first through eleventh examples. In the twelfth example, the method further comprises identifying pixels comprising specular highlights in the image and updating at least one of the image or a mask that identifies pixels in the region of interest to remove the specular highlights.

A thirteenth example may extend any of the first through twelfth examples. In the thirteenth example, the method further comprises determining an image class for the image of the face and determining the sharpness criterion based at least in part on the image class.

A fourteenth example may extend any of the first through thirteenth examples. In the fourteenth example, the method further comprises performing pixel intensity normalization on the image of the face prior to applying the focus operator to the pixels within the region of interest.

In a fifteenth example, a non-transitory computer readable medium includes instructions that are executable by a processing device. The instructions may be instructions for performing the methods of any of the first through fourteenth examples.

In a sixteenth example, a computing device comprises a memory to store instructions and further comprises a processor operatively coupled to the memory. The instructions may be instructions for performing the methods of any of the first through fourteenth examples. The processor may execute the instructions to perform the method of any of the first through fourteenth examples.

BRIEF DESCRIPTION OF THE DRAWINGS

Embodiments of the present disclosure are illustrated by way of example, and not by way of limitation, in the figures of the accompanying drawings.

FIG. 3A illustrates a flow diagram for a method of determining a region of interest in an image, in accordance with an embodiment.

FIG. 3B illustrates an image and a region of interest computed for the image, in accordance with an embodiment.

DETAILED DESCRIPTION

Figure 1:
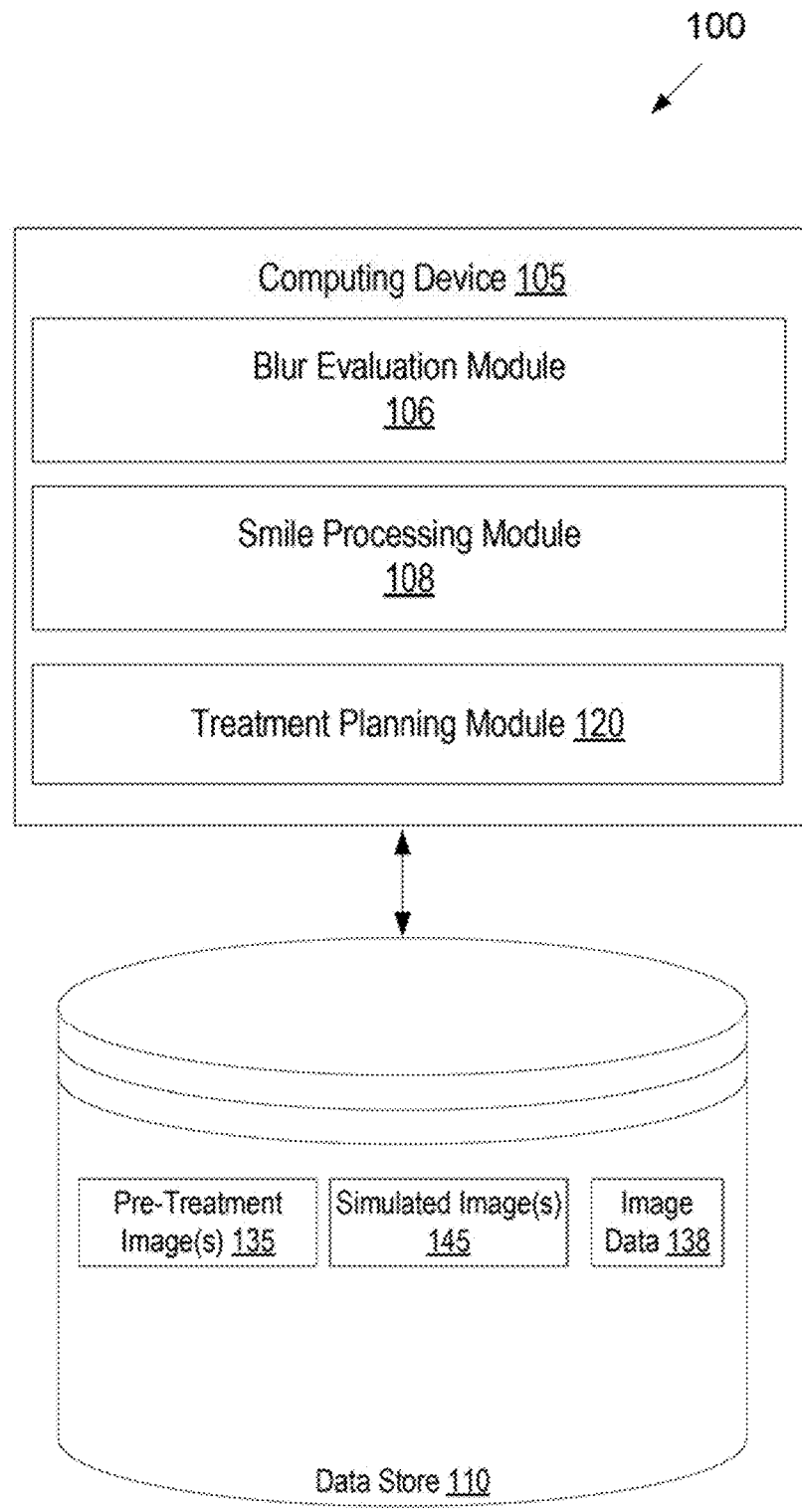
FIG. 1 illustrates one embodiment of a treatment planning system, in accordance with an embodiment.

Described herein are methods and systems for analyzing images that are within a particular domain or classification and making determinations of image quality based on the analysis. In particular, for various domains, different portions of images may be more important than other portions of the images. For example, in the domain of dentistry and orthodontics, the mouth, lips and teeth in an image may be more important than the nose, eyes, ears, hair, background, etc. in the image. In the domain of automated identification of persons from images, the region of the image that includes a person's face may be more important than regions of the image that contain the hair of the person, body of the person, background, and so on. Embodiments utilize information about the portions of images that are known to be important for a specific domain to more accurately assess the quality (e.g., blurriness) of the image for use in that domain.

For example, images that contain faces may be analyzed in an automated fashion without any user input to determine whether the images will be useful for one or more dental and/or orthodontic purposes. In a particular example, images that contain faces are analyzed to determine whether they are of sufficient image quality (e.g., have a high enough sharpness) for use in generating a simulated image showing a patient's smile after orthodontic treatment. The automated analysis may include determining a region of interest (ROI) in the image, where the ROI includes an area inside of a patient's lips in the image. The automated analysis may further include converting at least pixels in the ROI to grayscale, applying a focus operator to at least the pixels in the ROI, and calculating a sharpness metric for the ROI using an output of the focus operator. In embodiments in which the image is not converted to grayscale, the focus operator may be applied to one or more color channels of the image. The sharpness metric may reflect the blurriness and/or sharpness of just the ROI in the image, rather than the blurriness and/or sharpness of the image as a whole.

Consumer smile simulations are simulated images generated for consumers (e.g., patients) that show how the smiles of those consumers will look after some type of dental treatment (e.g., such as orthodontic treatment). Clinical smile simulations are simulated images used by dental professionals (e.g., orthodontists, dentists, etc.) to make assessments on how a patient's smile will look after some type of dental treatment. For both consumer smile simulations and clinical smile simulations, a goal is to produce a post-treatment realistic photo rendering of a patient's smile that may be used by a patient, potential patient and/or dental practitioner to view a treatment outcome. For both use cases, the general process of generating the simulated image showing the post-treatment smile includes taking a picture of the patient's current smile, simulating or generating a treatment plan for the patient that indicates post-treatment positions and orientations for teeth and gingiva, and converting data from the treatment plan back into a new simulated image showing the post-treatment smile. However, if the region of the image depicting the smile (e.g., the teeth and/or lips) of the patient is too blurry (e.g., has a sharpness metric that is below a sharpness threshold or a blurriness metric that is above a blurriness threshold), then the image may be unsuitable for generating a smile simulation.

The techniques described herein for measuring the image quality of an image for a particular domain or purpose provide a much higher accuracy than traditional approaches. In traditional approaches, the blurriness of an entire image is computed without any consideration of the application or domain for which the image will be used. This introduces increased noise, and lowers the usefulness of the result. Images were tested for image quality to determine whether those images were suitable for use as input images into a system that generates simulated images of patients with post-treatment smiles based on the input images showing pre-treatment smiles. When traditional systems that assess blurriness were used, there were significant numbers of false positives (in which the system identified an image as having a blurriness that was too high to use, when in fact the image was used to successfully generate a simulated image) as well as significant numbers of false negatives (in which the system identified an image as having a blurriness that was low enough for use, when in fact a simulated image was not successfully generated from the image). Traditional techniques for assessing image blurriness ultimately provided only a loose correlation between computed sharpness metrics and the quality of the image for use in a smile simulator. In contrast, tests performed using the system and method described in embodiments herein showed that the system and method provided a strong correlation between a computed sharpness metric and the quality of the image for use in a smile simulator. The tests showed very low numbers of false negatives and false positives for use of the system and method described in embodiments.

Note that embodiments are described herein with reference to assessing the quality of an image for use in the domain of dentistry and orthodontics, and more particularly for use in a specific application of generating, from an initial image of a patient showing pre-treatment dentition of the patient, a simulated image of the patient showing a new smile with post-treatment dentition of the patient. However, it should be understood that the system and method described in embodiments can be modified for use in assessing image quality for any application or domain in which there are particular regions of images that are known to be more important than other regions of the images. An example of a domain includes photography applications, in which the eye region is of particular import. For such a domain, ROIs may be determined around the eye regions of faces in images. In another example domain of automatic case assessment for dentistry/orthodontics, the ROI could be the specific location of a patient's teeth (rather than the mouth region generally). This may allow for greater focus of the teeth and prevent confusion from the palatal region and/or tongue. Such knowledge of the important regions of images for use in a particular domain may be used to train a machine learning model to determine a region of interest that includes the important region (or regions) in the images, and then blurriness or sharpness of the ROI may be determined using the techniques set forth herein. Accordingly, embodiments are not limited to the specific use case of smile simulation and/or image simulation described in greater detail below.

FIG. 1 illustrates one embodiment of a treatment planning system 100. In one embodiment, the treatment planning system 100 includes a computing device 105 and a data store 110. The treatment planning system 100 may additionally include, or be connected to, an image capture device such as a camera and/or an intraoral scanner. The computing device 105 may include physical machines and/or virtual machines hosted by physical machines. The physical machines may be rackmount servers, desktop computers, or other computing devices. The physical machines may include a processing device, memory, secondary storage, one or more input devices (e.g., such as a keyboard, mouse, tablet, speakers, or the like), one or more output devices (e.g., a display, a printer, etc.), and/or other hardware components. In one embodiment, the computing device 105 includes one or more virtual machines, which may be managed and provided by a cloud provider system. Each virtual machine offered by a cloud service provider may be hosted on one or more physical machine. Computing device 105 may be connected to data store 110 either directly or via a network. The network may be a local area network (LAN), a public wide area network (WAN) (e.g., the Internet), a private WAN (e.g., an intranet), or a combination thereof.

Data store 110 may be an internal data store, or an external data store that is connected to computing device 105 directly or via a network. Examples of network data stores include a storage area network (SAN), a network attached storage (NAS), and a storage service provided by a cloud provider system. Data store 110 may include one or more file systems, one or more databases, and/or other data storage arrangement.

The computing device 105 may receive one or more images from an image capture device or from multiple image capture devices. The image capture device may be or include a charge-coupled device (CCD) sensor and/or a complementary metal-oxide semiconductor (CMOS) sensor. The image capture device may provide images or video to the computing device 105 for processing. For example, the image capture device 160 may provide images to the computing device 105 that the computing device analyzes to identify a patient's mouth, a patient's face, a patient's dental arch, or the like. In some embodiments, the images captured by image capture device may be stored in data store 110 as pre-treatment images 135. For example, pre-treatment images 135 may be stored in data store 110 as a record of patient history or for computing device 105 to use for analysis of the patient and/or for generation of simulated post-treatment images. The image capture device may transmit the discrete images and/or video to the computing device 105, and computing device 105 may store the pre-treatment images 135 in data store 110. In some embodiments, the pre-treatment images 135 include two-dimensional data.

Computing device 105 includes a blur evaluation module 106, a smile processing module 108 and a treatment planning module 120 in embodiments. The treatment planning module 120 is responsible for generating a treatment plan that includes a treatment outcome for a patient. The treatment plan may be a simulated treatment plan that includes and/or is based on an initial 2D and/or 3D image of the patient's dental arches. For example, the treatment planning module 120 may receive 3D intraoral images of the patient's dental arches, and may stitch the 3D images together to create a virtual 3D model of the dental arches. Alternatively, the treatment planning module 120 may receive an initial 2D image, and may generate a virtual 3D model from the initial 2D image. The treatment planning module 120 may then determine current positions and orientations of the patient's teeth from the virtual 3D model and determine target final positions and orientations for the patient's teeth represented as a treatment outcome. The treatment planning module 120 may then generate a virtual 3D model showing the patient's dental arches at the end of treatment as well as one or more virtual 3D models showing the patient's dental arches at various intermediate stages of treatment. Alternatively, or additionally, the treatment planning module 120 may generate one or more 3D images and/or 2D images showing the patient's dental arches at various stages of treatment.

By way of non-limiting example, a treatment outcome may be the result of a variety of dental procedures. Such dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity, or a real or virtual model thereof, or directed to the design and preparation of the dental site to receive such a prosthesis. A prosthesis may include any restoration such as implants, crowns, veneers, inlays, onlays, and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances. Any of treatment outcomes or updates to treatment outcomes described herein may be based on these orthodontic and/or dental procedures. Examples of orthodontic treatments are treatments that reposition the teeth, treatments such as mandibular advancement that manipulate the lower jaw, treatments such as palatal expansion that widen the upper and/or lower palate, and so on. For example, an update to a treatment outcome may be generated by interaction with a user to perform one or more procedures to one or more portions of a patient's dental arch or mouth.

A treatment plan for producing a particular treatment outcome may be generated by first generating an intraoral scan of a patient's oral cavity. From the intraoral scan a virtual 3D model of the upper and/or lower dental arches of the patient may be generated. A dental practitioner may then determine a desired final position and orientation for the patient's teeth on the upper and lower dental arches, for the patient's bite, and so on. This information may be used to generate a virtual 3D model of the patient's upper and/or lower arches after orthodontic treatment. This data may be used to create an orthodontic treatment plan. The orthodontic treatment plan may include a sequence of orthodontic treatment stages. Each orthodontic treatment stage may adjust the patient's dentition by a prescribed amount, and may be associated with a 3D model of the patient's dental arch that shows the patient's dentition at that treatment stage.

A simulated treatment plan may additionally or alternatively be generated based on an initial 2D image of a patient's open-mouthed smile. A 3D model may be generated from the initial 2D image, and a dental practitioner or automated treatment planning software may determine a desired final position and orientation for the patient's teeth on the upper and lower dental arches, for the patient's bite, and so on. This information may be used to generate a new virtual 3D model of the patient's upper and/or lower arches after orthodontic treatment.

In some embodiments, the treatment planning module 120 may receive or generate one or more virtual 3D models, virtual 2D models, 3D images, 2D images, or other treatment outcome models and/or images based on received intraoral images. For example, an intraoral scan of the patient's oral cavity may be performed to generate an initial virtual 3D model of the upper and/or lower dental arches of the patient. Treatment planning module 120 may then determine a final treatment outcome based on the initial virtual 3D model, and then generate a new virtual 3D model representing the final treatment outcome.

Smile processing module 180 may generate simulated post-treatment images of patient smiles. To generate a simulated post-treatment image, smile processing module 180 may generate one or more blurring functions. This may include setting up the functions, and then solving for the one or more blurring functions using data from an initial pre-treatment image 135. In some embodiments, a first set of blurring functions is generated (e.g., set up and then solved for) with regards to a first region depicting teeth in the pre-treatment image 135 and a second set of blurring functions is generated with regards to a second region depicting gingiva in the pre-treatment image 135. Once the blurring functions are generated, these blurring functions may be applied to image data such as sketches depicting contours of the teeth and/or gingiva post-treatment. For example, the blurring functions for the teeth may be applied to a third region depicting the teeth in a post-treatment sketch and the blurring functions for the gingiva may be applied to a fourth region depicting the gingiva in the post-treatment sketch.

In some embodiments, the blur produced by the blurring functions is sufficiently great that the tooth structure is not readily apparent to a human observer. Alternatively, the tooth structure may be apparent in the blurred image. The post treatment sketch and a blurred color image comprising a blurred color representation of the gingiva and a blurred color representation of the teeth may then be used together to generate a photo-realistic simulated post-treatment image of the patient's smile. Color data for the simulated image of the post-treatment smile may be based on the blurred color image and the shape of the teeth and gingiva in the simulated image may be based on the post-treatment image data (e.g., a sketch of the teeth and gingiva as they will appear after treatment).

In some embodiments, neural networks, such as generative adversarial networks (GANs), conditional GANs or picture to picture GANs may be used to generate a post-treatment image of a smile having teeth in a final treatment position. The neural network may integrate data from a 3D model of an upper and/or lower dental arch with teeth in a final position with blurred color image of the patient's smile. The blurred color image of the patient's smile may be generated by applying one or more generated blurring functions to the data from the 3D model as described above. The data may be received as 3D data or as 2D data (e.g., as a 2D view of a 3D virtual model of the patient's dental arch). The neural network may use the input data to generate a simulated post-treatment image that matches the colors, tones, shading, etc. from the blurred color image with the shape and contours of the teeth and gingiva from the post treatment image data (e.g., data from the 3D model).

The neural network may have been trained using a training dataset comprising facial images (e.g., images of smiles showing teeth and gingiva), sketches associated with the facial images (e.g., showing contours of the facial images but possibly lacking color data) and blurred color images comprising color data associated with the facial images. In some embodiments, the facial images are the target and the sketches and blurred color inputs are the inputs used for training the neural network. The neural network may be trained to generate a photo-realistic image of a smile based on a combined input that includes a blurred color image that lacks structural data and a sketch that has structural data but may lack color data. The neural network may also be trained to identify teeth and their contours. For example, each tooth may be identified by type (e.g., upper left central incisor, lower right canine). The neural network may also be trained to identify other aspects and features during training, such as the location and color of the gingiva, the color of the teeth, the relative brightness of the surfaces within the mouth, and others.

After training, the neural network receives inputs for use in generating a realistic rendering of the patient's teeth in a clinical final position. In order to provide color information to the GAN model, a blurred color image that represents a set of color channels is provided along with a post-treatment sketch of teeth and/or gingiva for a patient. The color channels are based on the initial photo and contain information about the color and lighting of the teeth and/or gums in that initial image. In order to avoid sub-optimal results from the GAN model, no structural information (e.g., tooth location, shape, etc.) remains in the blurred color image in embodiments.

As discussed above, the inputs may include a blurred color image of the patient's teeth and gingiva as well as an image (e.g., a sketch) of teeth and/or gingiva in a clinical final position (e.g., a 2D rendering of a 3D model of the patient's teeth in the clinical final position), a 3D rendered model of the patients teeth in the clinical final position, and so on. The clinical final position of the patient's dentition may have been determined, for example, according to an orthodontic treatment plan.

The neural network uses the inputs and a set of trained model parameters to render a realistic image of the patient's teeth in a final position. This photo realistic image is then integrated into the mouth opening of the facial image and an alpha channel blurring may be applied.

In some embodiments, smile processing module 108 performs the operations as set forth in U.S. patent application Ser. No. 16/579,673, filed Sep. 23, 2019 and entitled "Generic Framework for Blurring of Colors for Teeth in Generated Images Using Height Map," which is incorporated by reference herein. In some embodiments, smile processing module 108 performs the operations as set forth in U.S. patent application Ser. No. 16/041,613, filed Jul. 20, 2018 and entitled "Parametric Blurring of Colors for Teeth in Generated Images," which is incorporated by reference herein.

In order for an initial image of a patient's face to be useable to generate a high quality simulated image of the patient's face showing a post-treatment smile, the initial image should be of sufficient image quality. In one embodiment, an image is deemed to have sufficient image quality if it has a sharpness metric that satisfies a sharpness criterion. The sharpness metric may be a sharpness metric that is computed for the initial image using blur evaluation module 106.

In embodiments, blur evaluation module 106 evaluates pre-treatment images 135 to determine whether those pre-treatment images 135 are suitable for use in producing simulated images 145. The operations performed by blur evaluation module 106 to assess the image quality of a pre-treatment image 135, and to determine whether the pre-treatment image has sufficient image quality for input into smile processing module 108 and use in generation of a simulated image 145, are described below with reference to FIGS. 2-4B. Once pre-treatment images are processed by blur evaluation module 106, blur evaluation module may label the processed pre-treatment images with a sharpness metric and/or label the pre-treatment images with a label of pass or fail (where pass means the pre-treatment image may be processed by smile processing module 108 to produce a simulated image, and where fail means the pre-treatment image should not be processed by smile processing module 108 to produce a simulated image). This may include adding metadata to a pre-treatment image 135 and/or associating metadata with the pre-treatment image 135 indicating the sharpness metric and/or pass/fail rating for that pre-treatment image. Smile processing module 108 may then process those pre-treatment images 135 that have a sharpness metric that satisfies a sharpness criterion and/or that have a "pass" label.

In embodiments, pre-treatment images 135 and simulated images 145 may be stored in a data store 110 (or in separate data stores). Additionally, one or more virtual 3D models (e.g., representing a patient's current dentition and/or a patient's target final dentition) may be stored in the data store 110. For example, pre-treatment images 135 and simulated images 145 may be stored as entries in the same database or in separate databases. In an example, a database may contain separate entries for each x,y pixel location and associated depth (z) value of a pre-treatment image 135. An entry may include a value for an x coordinate, a value for a y coordinate, a depth (z) value, values for each of the color channels of a color space at the x,y location, a value indicating whether the x,y pixel location is associated with a tooth region or a gingiva region, and so on. Operations performed by the smile processing module 108 to generate blurred color representations and/or to generate simulated images 145 may be performed as mathematical operations between different database entries in the data store 110 (or multiple data stores).

Figure 2:
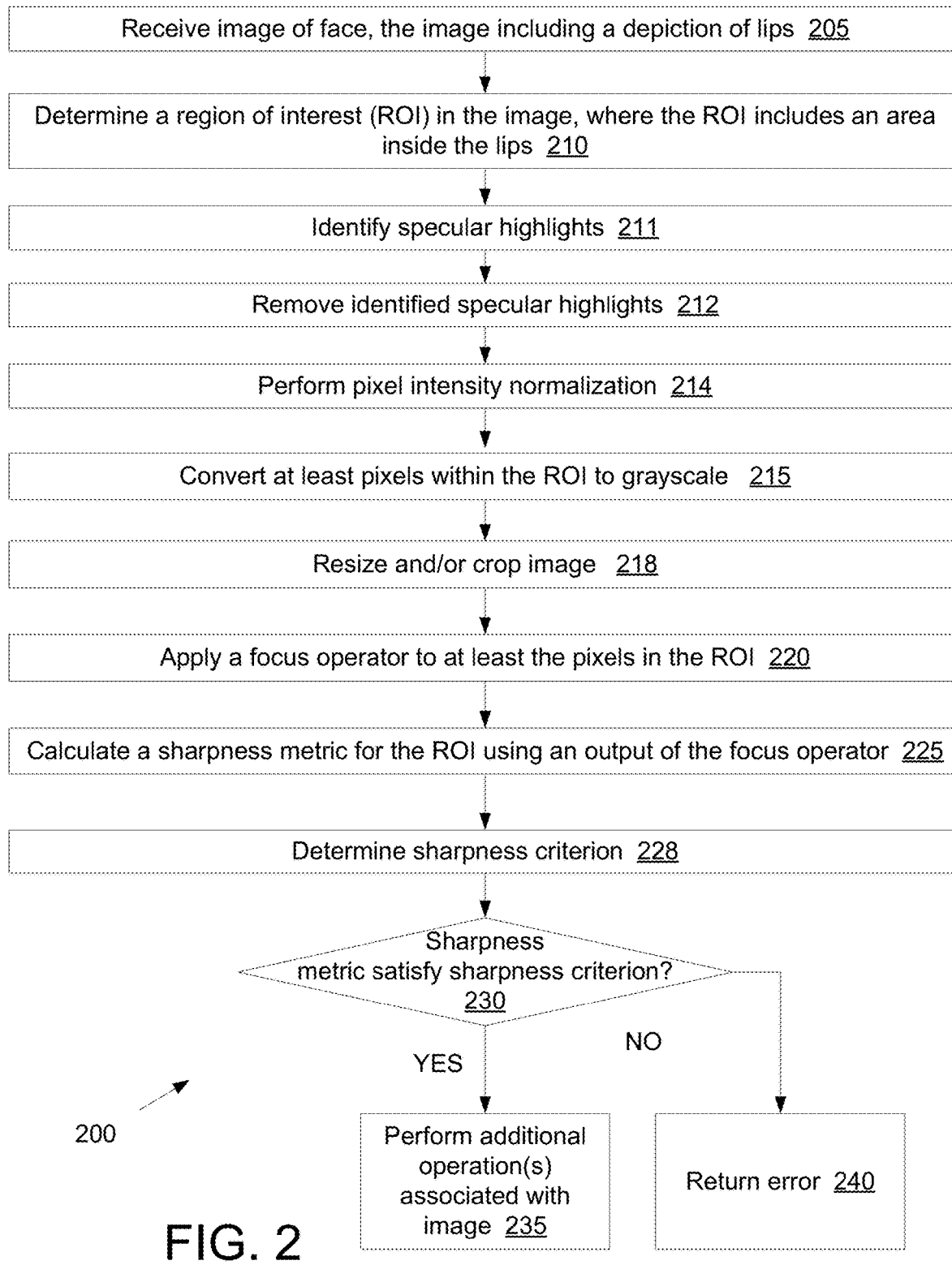
FIG. 2 illustrates a flow diagram for a method of determining a blurriness of an image, in accordance with an embodiment.

FIG. 2 illustrates a flow diagram for a method 200 of determining a blurriness of an image, in accordance with an embodiment. In particular, method 200 may be used to determine the image quality of an image for use in a particular domain or application, where the image quality is based on the blurriness of a particular portion or region of the image. Method 200 is described with reference for determining the image quality of an image for use in a smile simulator. However, this is merely one use case, and other use cases are envisioned. Method 200 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 105 as described with reference to FIG. 1, for example.

At block 205 of method 200, processing logic receives an image of a face of a patient. The image includes a depiction of lips of the patient, and may additionally include depictions of the patient's pre-treatment dentition.

At block 210, processing logic determines a region of interest (ROI) in the image. For the use case of detecting image quality for a smile simulation application, the ROI may include an area inside of the lips. In other use cases, the ROI may include other areas of an image.

In one embodiment, a trained machine learning model is used to determine the ROI in the image. The trained machine learning model may be an artificial neural network or other deep learning model. Alternatively, the ROI may be determined using other types of machine learning models, such as a simple rectangular bounding box based on image key points or a tighter boundary based on detailed facial landmark points found via a Histogram of oriented gradients (HoG) classifier, a Haar cascade algorithm, or image-based regression trees.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling may be performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize that the image contains a face or define a bounding box around teeth in the image. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available. For model training, a training dataset containing hundreds, thousands, tens of thousands, hundreds of thousands or more images that include labels of ROIs and/or bounding shapes may be used. The images in the training dataset may all be for a specific domain or application (e.g., may all be images of teeth with bounding boxes or ROIs labeled around lips in the images. After training, the machine learning model may be trained to identify ROIs and/or to identify bounding shapes, as appropriate.

The machine learning model may be trained to generate a probability map for an image, where the probability map indicates for each pixel in the image a probability that the pixel is included in an ROI. The probability map may be used as a mask for the image. Alternatively, the machine learning model may be trained to generate a binary matrix or maps for an image, the binary matrix or map identifies, for each pixel in the image, whether the image is included in the ROI. The binary matrix or map may be used as a mask for the image. Alternatively, the machine learning model may be trained to determine a bounding shape around teeth and/or lips in the image. The bounding shape may then be used to determine the ROI, where the ROI may include the pixels inside of the bounding shape. The bounding shape may be, for example, a bonding box or a bounding ellipse. A "bounding shape," as used herein, may include a geometrical object that bounds a particular area of an image. It is noted that a bounding shape may comprise any polygon (isolateral or not) or other shape (e.g., elliptical or circular shape). In some implementations, a bounding shape comprises a closed shape having a plurality of sides. Determining the bounding shape may further include generating a mask for the image, wherein each entry in the mask is associated with a pixel in the image and indicates for that pixel whether the pixel is inside of the bounding shape or is outside of the bounding shape.

FIG. 3A illustrates a flow diagram for a method 300 of determining a region of interest in an image, in accordance with an embodiment. Method 300 may be performed at block 210 of method 200 in embodiments. At block 304 of method 300, processing logic processes an image using a trained machine learning model that has been trained to identify areas inside of lips in image of faces (or to identify other ROIs). The output of the trained machine learning model may be a probability map that identifies, for each pixel in the image, a probability that the pixel is within an ROI in the image. In an embodiment, the ROI includes an area inside of the lips depicted in the image. Alternatively, rather than a probability map processing logic may output a binary mask or matrix based on the image, wherein the binary mask identifies, for each pixel, whether or not that pixel is part of the ROI.

At block 306, processing logic may generate a mask for the image. Each entry in the mask may be associated with a specific pixel in the image that indicates for that pixel whether the specific pixel is inside of the ROI. In one embodiment, generation of the mask includes changing the probability values of the probability map into binary values (e.g., 1 or 0), where a first value (e.g., 1 or true) indicates that the pixel is inside of the ROI and a second value (e.g., 0 or false) indicates that the pixel is outside of the ROI. In one embodiment, all probability values that are over a probability threshold (e.g., 50%, 60%, 70%, 80%, 90%, etc.) are given a value (e.g., 1 or true) that indicates that the pixel is inside of the ROI. All other pixels may be given a value (e.g., 0 or false) that indicates that the pixel is outside of the ROI. The operations of block 306 may be omitted if the machine learning model outputs a binary mask.

FIG. 3B illustrates an image 310 and a region of interest computed for the image, in accordance with an embodiment. As shown, the image 310 includes a depiction of lips 313. The image 310 is processed by a trained machine learning model as set forth in method 300. A probability map or binary matrix is output by the machine learning model, and a mask 314 may be generated from the probability map or binary matrix. As shown, the mask 314 includes a ROI 316 and a second region 318 that is outside of the ROI 316.

Figure 3D:
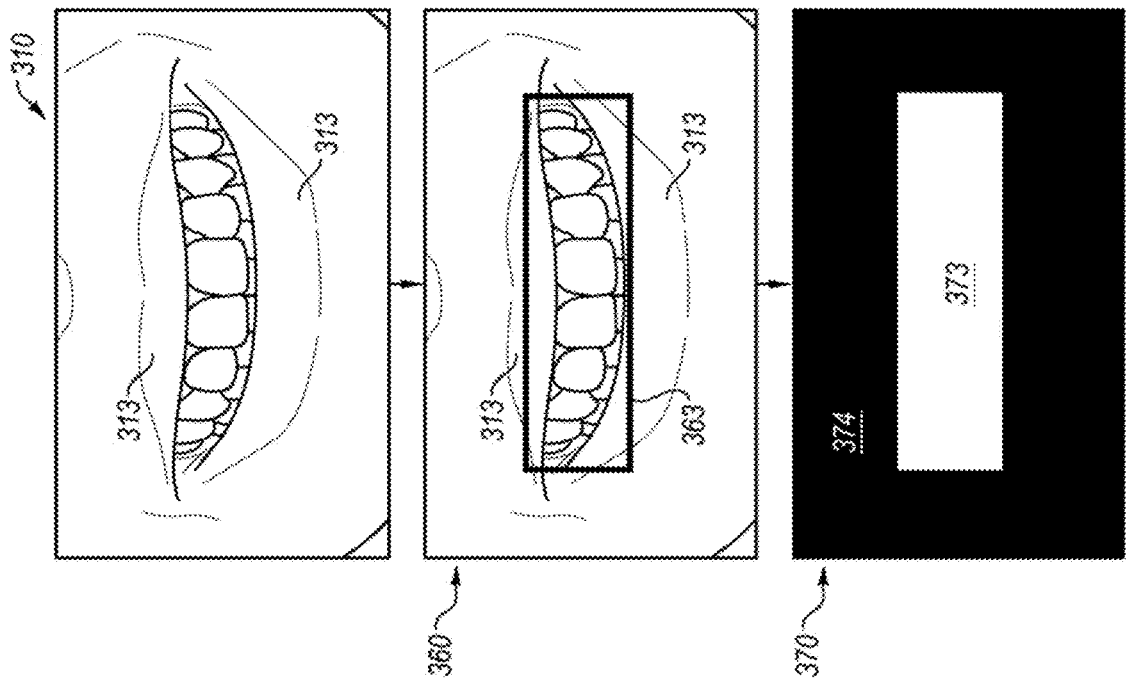
FIG. 3D illustrates an image and a region of interest computed for the image, in accordance with an embodiment.
Figure 3C:
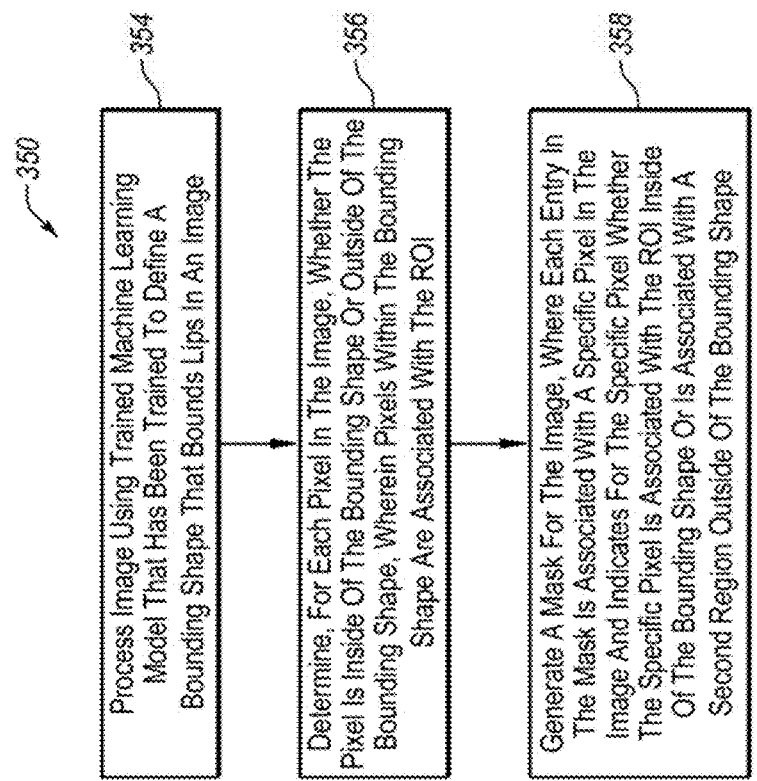
FIG. 3C illustrates a flow diagram for a method of determining a region of interest in an image, in accordance with an embodiment.

FIG. 3C illustrates a flow diagram for a method 350 of determining a region of interest in an image, in accordance with an embodiment. Method 350 may be performed at block 210 of method 200 in embodiments. At block 354 of method 350, processing logic processes an image using a trained machine learning model that has been trained to generate a bounding shape that bounds lips in the image (or that bounds some other ROI in the image). The output of the trained machine learning model may be a probability map that identifies, for each pixel in the image, a probability that the pixel is part of the bounding shape. Alternatively, the output of the machine learning model may be a binary matrix that indicates, for each pixel in the image, whether that pixel is inside of the bounding shape (and part of the ROI).

At block 356, processing logic determines, for each pixel in the image, whether the pixel is inside of the bounding shape or is outside of the bounding shape. The pixels within the bounding shape are associated with the ROI. In an alternative embodiment, at block 354 the machine learning model outputs a probability map indicating, for each pixel, whether that pixel is inside of the bounding shape or outside of the bounding shape. In such an embodiment, the operations of bock 356 may be omitted.

At block 358, processing logic may generate a mask for the image. Each entry in the mask may be associated with a specific pixel in the image that indicates for that pixel whether the specific pixel is inside of the ROI. In one embodiment, generation of the mask includes changing the probability values of the probability map into binary values (e.g., 1 or 0), where a first value (e.g., 1) indicates that the pixel is inside of the ROI and a second value (e.g., 0) indicates that the pixel is outside of the ROI. In one embodiment, all probability values that are over a probability threshold (e.g., 50%, 60%, 70%, 80%, 90%, etc.) are given a value that indicates that the pixel is inside of the ROI (defined by the bounding shape). All other pixels may be given a value that indicates that the pixel is outside of the ROI. The operations of block 358 may be omitted if the machine learning model outputs a binary matrix (i.e., a binary mask) indicating, for each pixel, whether or not that pixel is inside of the bounding shape.

FIG. 3D illustrates an image 310 and a region of interest computed for the image, in accordance with an embodiment. As shown, the image 310 includes a depiction of lips 313. The image 310 is processed by a trained machine learning model as set forth in method 350. A probability map is output by the machine learning model, which indicates a bounding shape 363 around a ROI. An image 360 with the bounding shape 363 is shown. A mask 370 may be generated from the probability map. As shown, the mask 370 includes a ROI 373 and a second region 374 that is outside of the ROI 316.

Referring back to FIG. 2, as set forth above, the machine learning model may receive an image of a face as an input and generate as an output a) a bounding shape defining the ROI in the image and/or b) a probability map or binary matrix indicating a probability of each pixel in the image is included in the ROI. The bounding shape and/or probability map (or binary matrix) may function as a mask or be used to generate a mask defining the ROI. Once the mask is generated, the mask may be used to perform one or more image processing operations on just the ROI rather than on the entire image. This may reduce a number of pixels to consider for future analysis, reducing computational resources that are used in assessing the image. Additionally, this may improve a sharpness metric ultimately output by processing logic for a specific domain or purpose.

Shiny surfaces can cause bright reflections (referred to as specular highlights) where the surface normal is midway between the incident angle of a lighting source to the surface and the angle of the camera to the surface. These highlights show up as very sharp discontinuities in neighboring pixel intensities and therefore will have large values in the Laplacian (when a Laplacian is computed), which can cause processing logic to falsely identify an image as sharp. Accordingly, in one embodiment the image is analyzed to identify and/or remove specular highlights.

In one embodiment, at block 211 processing logic processes the image to determine whether the image contains any specular highlights. Processing logic may identify specular highlights by finding the intensity standard deviation of a localized region centered on each pixel in the image using the following sequence:

a) Construct a K×K matrix, kernel, with values $$\frac{1}{K^2};$$

b) Compute the pixel-wise square of the image $I_{sq} \leftarrow I^2$;
c) Find a local pixel mean, $\bar{I}$, by convolving kernel with I;
d) Find a local squared pixel mean, $\bar{I}_{sq}$, by convolving kernel with $I_{sq}$;
e) Compute the variance image, $I_{var} \leftarrow \bar{I}_{sq} - \bar{I}^2$;
f) Compute the standard deviation image, $I_{std} \rightarrow \sqrt{I_{var}}$;
g) Find the raw highlight mask, R where $I > \bar{I} + DI_{std}$ and $I_{std} > SD_{thresh}$; and
h) Find the final highlight mask, M, by dilating R by Dilate pixels, where I is the image, K is the size of the localized region for computing image averages, D is the number of standard deviations above the mean to use when finding the highlight mask, $SD_{min}$ is the minimum local standard deviation to include a pixel in the highlight mask, and Dilate is the amount of dilation from the raw highlight mask to the final highlight mask.

The size of K depends on the size of the image. In one embodiment, K=51, D=1, $SD_{min}$=25, and Dilate=5.

In one embodiment, at block 212 processing logic removes the specular highlights from the image. Removing the specular highlights may be accomplished by performing inpainting over pixels that were identified as specular highlights. Alternatively, removing the specular highlights may be accomplished by excluding highlights from the region of interest identified ab block 210 (e.g., converting values for the pixel identified as specular highlights from 1 or true to 0 or false to exclude those pixels from the domain-specific mask).

In one embodiment, processing logic uses a highlight mask, M, to update the domain-specific mask by clearing (e.g., setting to 0 or False) the pixels in the domain-specific mask where the highlight mask is 1 or True. In this mode, a Gaussian of the whole image may be found, as well as a Laplacian, at block 220. The variance may then be computed over the updated mask, ignoring the regions with specular-highlights.

In one embodiment, processing logic performs inpainting on the masked regions in the original image. Processing logic may use a traditional inpainting method, such as the Fast Marching Method. In one embodiment, the inpainting occurs only in regions of the image where the highlight mask, M, is 1 or True. This creates an image that has reasonable values in the masked region and does not exhibit the sharp discontinuities that can confuse the Variance of Laplacian of Gaussian blur metric and/or other sharpness metric determined at block 225. In one embodiment, blocks 211 and 212 are skipped.

Some images may be sharp but have their pixel intensities in a particular range (i.e., they are too dark or too light). This implies that a Laplacian computed from such images could have smaller values than other images with a fuller range of pixel intensities even on sharp edges. By normalizing the image brightness, processing logic can ensure that a single sharpness metric threshold will work for a large range of images (i.e., that have different ranges of pixel intensities). Accordingly, in one embodiment, at block 214 processing logic performs pixel intensity normalization on the image. Alternatively, block 214 may be skipped. Three different techniques for performing pixel intensity normalization are discussed herein. However, any type of normalization technique may be used to normalize the pixel intensities of an image.

A first type of normalization technique that may be used to normalize pixel intensity is histogram stretching. To stretch a histogram of an image, processing logic transforms the pixel intensities of the image so that they fill the entire possible space of pixel intensities (e.g., 0-255). Given an M×N image, I, where $I_{i,j}$ is the intensity of the i-th row and j-th column of the image, processing logic computes the maximum and minimum pixel intensities as follows:

$$pixel_{min} = \min_{i=1}^{M} \min_{j=1}^{N} I_{i,j}$$

$$pixel_{max} = \max_{i=1}^{M} \max_{j=1}^{N} I_{i,j}$$

Using $pixel_{min}$ and $pixel_{max}$, processing logic computes a transform equation as follows:

$$h(v) = round\left(\frac{v - pixel_{min}}{pixel_{max} - pixel_{min}} \times 255\right)$$

where for v=0 . . . 255.

Using h(v), processing logic can transform the image by setting each pixel in the transformed image, $I'_{i,j}$ as:

$$I'_{i,j} = h(I_{i,j})$$

A second type of normalization technique that may be used to normalize pixel intensity is histogram equalization. In histogram equalization, the objective of the operation is to distribute the histogram of pixel intensities equally across the entire range of possible intensities so that on average, each pixel intensity range has the same pixel count per intensity as any other. The process of histogram equalization is to first compute the pixel intensities over an M×N image, I, where $I_{i,j}$ is the intensity of the i-th row and j-th column of the image, as follows:

$$pixel_k = \sum_{i=1}^{M} \sum_{j=1}^{N} [I_{i,j} = k]^1$$

for k=0 . . . 255.

Next, processing logic computes the cumulative histogram, as follows:

$$cdf_k = \sum_{j=0}^{k} pixel_j$$

for k=0 . . . 255.

The histogram equalization table for pixel intensities v, can be found as:

$$h(v) = round\left(\frac{cdf_v - cdf_{min}}{(M \times N) - cdf_{min}} \times 255\right)$$

for v=0 . . . 255, where $cdf_{min}$ is the minimum non-zero value of the cdf.

Using h(v), the image can be transformed by setting each pixel in the transformed image, $I'_{i,j}$ as:

$$I'_{i,j} = h(I_{i,j})$$

A third type of normalization technique that may be used to normalize pixel intensity is histogram normalization. Histogram normalization is another function on pixel intensities. It is similar to histogram stretching in that it is primarily a linear function of pixel intensity, but where histogram stretching attempts to use the full intensity range and histogram normalization and histogram equalization attempts to adjust the intensity histogram to be constant across the full intensity range, histogram normalization attempts to construct an intensity mapping with a standard statistical distribution. To perform histogram normalization, processing logic first selects a target mean and variance of the intensity distribution, $T_{mean}$ and $T_{var}$, respectively. For a given image, I, processing logic can compute the intensity mean and variance as $I_{mean}$ and $I_{var}$. The intensity mapping function is then found as follows:

$$a = \sqrt{T_{var} / I_{var}}$$

$$b = T_{mean} - aI_{mean}$$

$$h'(v) = round\ (av + b)$$

$$h(v) = \begin{cases} 0, & \text{if } h'(v) < 0 \\ 255, & \text{if } h'(v) > 255 \\ h'(v) & \text{otherwise} \end{cases}$$

for v=0 . . . 255.

Typical values of $T_{mean}$ and $T_{var}$ are 128 and 2500, respectively. Using h(v), processing logic can transform the image by setting each pixel in the transformed image, $I'_{i,j}$ as:

$$I'_{i,j} = h(I_{i,j})$$

In some embodiments, the operations of blocks 211, 212 and/or 214 are performed prior to the operations of block 210. In some embodiments, the operations of blocks 211, 212 and/or 214 are performed after the operations of block 215 or after the operations of block 218.

At block 215 of method 200, processing logic may convert at least the pixels within the ROI to grayscale. These pixels may be identified from a mask that identifies, for each pixel in the image, whether the pixel is inside of the ROI or is not inside of the ROI. In some embodiments, only the pixels in the ROI are converted to grayscale. Alternatively, all of the pixels of the image may be converted to grayscale. Alternatively, conversion of the image to grayscale may not be performed.

At block 218, processing logic may resize and/or crop the image. In one embodiment, the image is resized and/or cropped to cause a size of the ROI to be within a size range. In one embodiment, the image is cropped around the ROI. If the ROI is a bounding box, then the image may be cropped on the borders of the bounding box. If the ROI has another shape (e.g., is the shape of the inside of a patient's lips), then the image may be cropped in a manner that most of a second region outside of the ROI is removed, and none of the ROI is removed. In one embodiment, a bounding box is determined around the ROI, and the image is cropped along the bounding box. In one embodiment, the bounding box has a fixed width to height ratio. For example, the bounding box may have a fixed width to height ratio of 2:1, wherein there are two horizontal pixels for every vertical pixel. Other width to height ratios may also be used.

Once the image is cropped, the cropped image may be resized to cause the ROI to have a size that is within the size range. The size is selected based on the application in embodiments. Some example sizes include 128×64 pixels, 256×128 pixels and 512×256 pixels. Other sizes may also be used which may be the same or different aspect ratios, such as 128×128 pixels, 128×32 pixels, 256×256 pixels, and 256×64 pixels, for example. Alternatively, the image may be resized to adjust a size of the ROI without cropping the image. In some embodiments, the operations of block 218 are performed before the operations of block 215.

At block 220, a focus operator is applied to at least the pixels in the ROI. The focus operator may be applied to the grayscale pixels output at block 215 (or to color pixels if the operations of block 215 are omitted), optionally as resized and/or cropped at block 218. If the image is a color image, the focus operator may be applied separately to each color channel (e.g., to a red color channel, a blue color channel and a green color channel for each pixel). Accordingly, the focus operator may generate multiple outputs for each pixel, where each output is associated with a different color channel. In one embodiment, the focus operator is applied only to the pixels in the ROI. Alternatively, the focus operator may be applied to all of the pixels of the image that have been converted to grayscale.

Some examples of focus operators that may be used are a Laplacian filter and a Laplacian of Gaussian (LoG) filter (a Gaussian filter followed by a Laplacian filter). Other suitable convolutional operators may also be used, such as a Sobel filter or an edge detector.

In one embodiment, the focus operator is a trained machine learning model (e.g., a trained artificial neural network) that has been trained to detect edges. The trained machine learning model may output values for each of the pixels in the ROI, which may then be used to calculate a sharpness metric. In one embodiment, the focus operator is a trained machine learning model that has been trained to output a sharpness metric or a sharpness classification for an input image. The trained machine learning model may have been trained using a training dataset comprising a first set of images that are labeled as sharp images and a second set of images that are labeled as blurry images. Alternatively, the trained machine learning model may have been trained using a training dataset comprising multiple different classes of images, where each class of images is labeled with a particular sharpness metric range. Such a trained machine learning model may be trained to provide a specific sharpness metric for input images.

The trained machine learning model may receive an image as an input and output a classification for the image, where the classification may indicate whether the image is a sharp image or a blurry image. Alternatively, the machine learning model may output a probability score, where the probability score indicates a probability that the image is a sharp image. Alternatively, the machine learning model may output a sharpness metric that represents the level of blurriness or sharpness in the image.

In one embodiment in which the focus operator is a sequence of a Gaussian filter followed by a Laplacian filter (e.g., an LoG filter), the Gaussian filter may have a set radius, which may be a small, medium or high radius (e.g., a radius of at least 5, 10, 20, 40, or 50 pixels). The Gaussian filter may be applied across the initial image in order to perform Gaussian blurring of the image. The Gaussian blurring of the image involves convolving a two-dimensional convolution kernel over the image and producing a set of results. Gaussian kernels are parameterized by sigma ($\sigma$), the kernel width, and are generally specified in pixels. Sigma a may be the standard deviation of the Gaussian. If the kernel width is the same in the x and y dimensions, then the Gaussian kernel is typically a matrix of size $6\sigma+1$ where the center pixel is the focus of the convolution and all pixels can be indexed by their distance from the center in the x and y dimensions. The value for each point in the kernel is given as:

$$G(x, y) = \frac{1}{2\pi\sigma^2} e^{-\frac{x^2+y^2}{2\sigma^2}} \quad (1)$$

In the case where the kernel width is different in the x and y dimensions, the kernel values are specified as:

$$G(x, y) = G(x)G(y) = \frac{1}{2\pi\sigma_x\sigma_y} e^{-\left(\frac{x^2}{2\sigma_x^2} + \frac{y^2}{2\sigma_y^2}\right)} \quad (2)$$

The Laplacian filter is typically a 3×3 matrix, and the kernel values are specified as:

$$L(x, y) = \frac{\partial^2 I}{\partial x^2} + \frac{\partial^2 I}{\partial y^2} \quad (3)$$

The combined Gaussian and Laplacian filters, resulting in the LoG filter, in which the kernel values are specified as:

$$LoG(x, y) = -\frac{1}{\pi\sigma^4}\left[1 - \frac{x^2+y^2}{2\sigma^2}\right] e^{-\frac{x^2+y^2}{2\sigma^2}} \quad (4)$$

The Laplacian filter (operator) may have a fixed size (e.g., a fixed 3×3 size). However, the ratio of image size to operator size (e.g., kernel size) may vary. If the image size is too large, the Laplacian operator is essentially evaluating noise. However, the size of the LoG operator can be easily adjusted by changing the value of the kernel a. Accordingly, the LoG filter has been shown to provide particularly accurate results.

In one embodiment, the value of the kernel for the LoG filter has a predetermined size. Some example kernel sizes that may be used are 15×15 pixels, 17×17 pixels and 19×19 pixels. The kernel may have the same value in x and y (as in the provided examples), or may have different values in x and y (e.g., 15×17 pixels, 10×15 pixels, and so on). In one embodiment, the kernel size is a function of a (e.g., may be $6\sigma+1$). In one embodiment, the sigma that is used has a value between 2 and 3 (e.g., a value of 2.5). By adjusting the size of the image prior to processing it using the LoG filter, a ratio of the size of the kernel (or size of sigma) to the size of the ROI may be controlled. Maintaining the ratio of the kernel size (or sigma size) to the ROI size to within a target range may ensure consistent results of the LoG filter applied to images. In alternative embodiments, the size of the ROI may not be adjusted at block 218, and instead a size of the kernel and/or σ may be adjusted based on the size of the ROI in order to cause the ratio of the kernel size and/or sigma size to the ROI size to be within a target range.

At block 225, processing logic calculates a sharpness metric for the ROI using an output of the focus operator. If the focus operator used at block 220 output a sharpness metric or sharpness decision, then the operations of block 225 may be omitted and/or may have been performed at block 220. If the focus operator was used on color pixels, then there may be multiple outputs of the focus operator (e.g., one for each color channel). These outputs may be combined in embodiments. In one embodiment, an average of the multiple outputs is determined for each pixel. In one embodiment, for each pixel a minimum value of the multiple outputs for the pixel used as a final value for the pixel. In one embodiment, for each pixel a maximum value of the multiple outputs for the pixel used as a final value for the pixel. Notably, data for pixels inside of the ROI is used to compute the sharpness metric, and data for pixels outside of the ROI is not used to compute the sharpness metric. In one embodiment, processing logic calculates a variance of the pixels in the ROI using the values output by the focus operator, which may be used as the sharpness metric. Alternatively, the standard deviation may be used for the sharpness metric. The variance is the expectation of the squared deviation of a random value from its mean. Variance measures how far a set of random numbers are spread from their average value. Variance may be calculated as the square of the standard deviation. Accordingly, the standard deviation of the pixel values in the ROI output by the focus operator may be computed. The standard deviation may then be squared to compute the variance. A higher variance represents a sharper ROI (i.e. an ROI with a lower blurriness), while a lower variance represents a blurrier ROI.

As described herein, blurriness detection may be designed to be domain specific through the use of a mask that allows for focusing on specific regions of an image, where a masked region is used to compute the sharpness metric. However, there are cases where different image types might be processed within the same domain. For example, in the dentistry or orthodontics use case, there are multiple types of "mouth" images that one might take, including a social-smile image and one or more clinical images. For some applications, such as virtual dental care, there are multiple types of image taken in the same application. For example, virtual dental care may include: (i) closed-bite images with no aligners, (ii) open-bite images with no aligners, and (iii) open-bite images with aligners. Each of the three example types of images that may be taken for virtual dental care have different visual properties. For example, closed-bite images with no aligners are more similar to a social smile in that there are no sharp transitions between teeth pixels and open mouth pixels in the images. Open-bite images, on the other hand, do exhibit a sharp transition between teeth pixels and open mouth pixels, which shows up as a strong edge (e.g., in the LoG algorithm). Open-bite images with aligners may lack some of the strong edges between the teeth.

In one embodiment the sharpness metric threshold is at least partially dependent on a type of image that was received at block 205. Accordingly, in one embodiment at block 228 processing logic determines a sharpness criterion based at least in part on an image type of the image. The image type may be input by a user or may be automatically determined based on one or more properties of the image. In one embodiment, the image type of the image is determined by inputting the image into an algorithm or a trained machine learning model that has been trained to classify images as one of a set of possibly types of images. The trained machine learning model may be, for example, a neural network such as a convolutional neural network. In an example, the trained machine learning model may have been trained to classify images as one of (i) a closed-bite image with no aligners, (ii) an open-bite image with no aligners, or (iii) an open-bite image with aligners.

Determining the sharpness criterion may include, for example, determining a sharpness metric threshold to apply. In an example, a separate sharpness criterion (e.g., a separate sharpness metric threshold) may be used for each type of image. For example, a first sharpness metric threshold may be used for closed-bite images with no aligners, a second sharpness metric threshold may be used for open-bite images with no aligners, and a third sharpness metric threshold may be used for open-bite images with aligners. Virtual dental images may include left, right and anterior versions of each of the classes of (i) closed-bite image with no aligners, (ii) an open-bite image with no aligners, or (iii) an open-bite image with aligners. In one embodiment, there are nine classes of images, including: (i) left closed-bite image with no aligners, (ii) left open-bite image with no aligners, (iii) left open-bite image with aligners, (iv) right closed-bite image with no aligners, (v) right open-bite image with no aligners, (vi) right open-bite image with aligners, (vii) anterior closed-bite image with no aligners, (viii) anterior open-bite image with no aligners, and (ix) anterior open-bite image with aligners. A different sharpness metric threshold may be used for each of the nine classes.

At block 230, processing logic determines whether the sharpness metric computed for the image (e.g., for the ROI of the image) satisfies the determined sharpness criterion. In one embodiment, the sharpness metric satisfies the sharpness criterion if it meets or exceeds a determined sharpness metric threshold. Examples of sharpness metric thresholds are variance thresholds of 5, 10, 15, 20, and so on. If the sharpness metric satisfies the sharpness criterion, the method continues to block 235. Otherwise, the method proceeds to block 240.

At block 235, one or more additional operations associated with the image are performed. This may include, for example, processing the image by a smile simulator to generate a simulated image that is a modification of the input image. The simulated image may include multiple features of the input image, but may include a post-treatment dentition rather than a pre-treatment dentition represented in the input image. Another example operation is to train a machine learning model using the image. For example, the image may be used to train a GAN or other neural network to generate simulated images. Another example operation is facial anonymization. For example, images of faces may be processed to determine if a person in the image is identifiable. If the sharpness metric is too high, then this may indicate that the person is identifiable. Accordingly, a blurring operation may be performed on the face of the person in the image to anonymize the image. Additionally, or alternatively, processing logic may label the image with metadata indicating that the image passed an image quality test for a specific domain and/or application.

At block 240, processing logic may output an error. The error may indicate to a user that uploaded the image that the image is of insufficient image quality for use in the intended domain and/or application. Additionally, or alternatively, processing logic may label the image with metadata indicating that the image failed an image quality test for a specific domain and/or application.

Figure 4B:
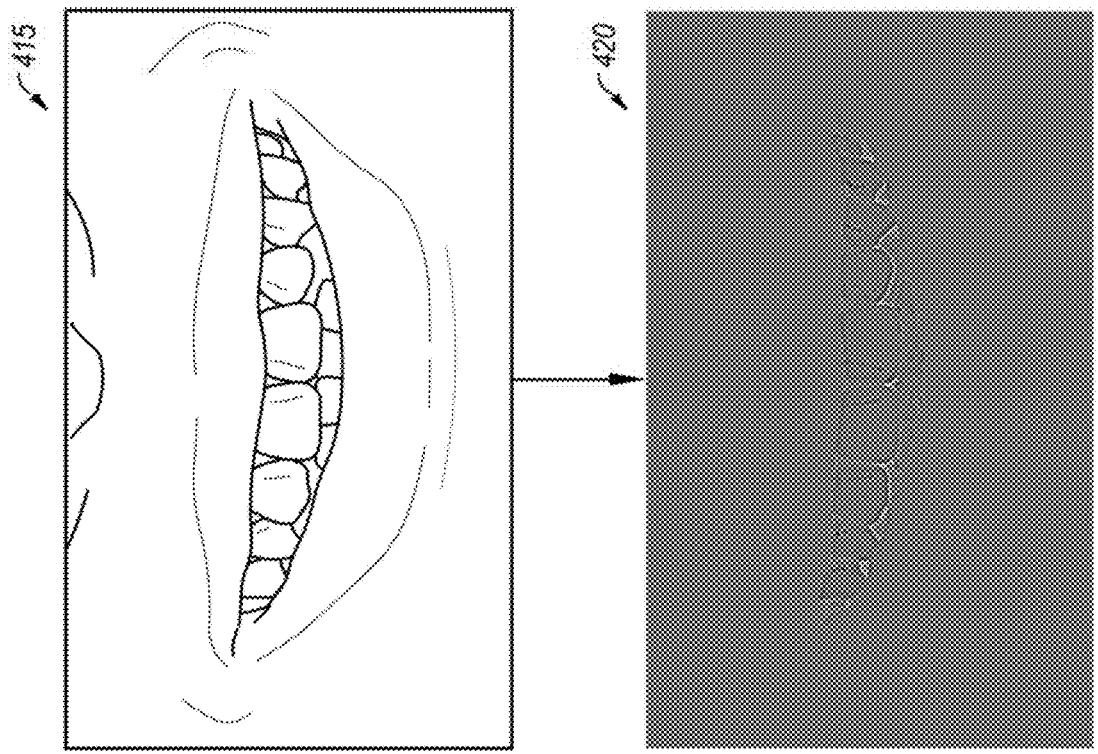
FIG. 4B illustrates an initial sharp image and a filtered version of the initial sharp image, in accordance with an embodiment.
Figure 4A:
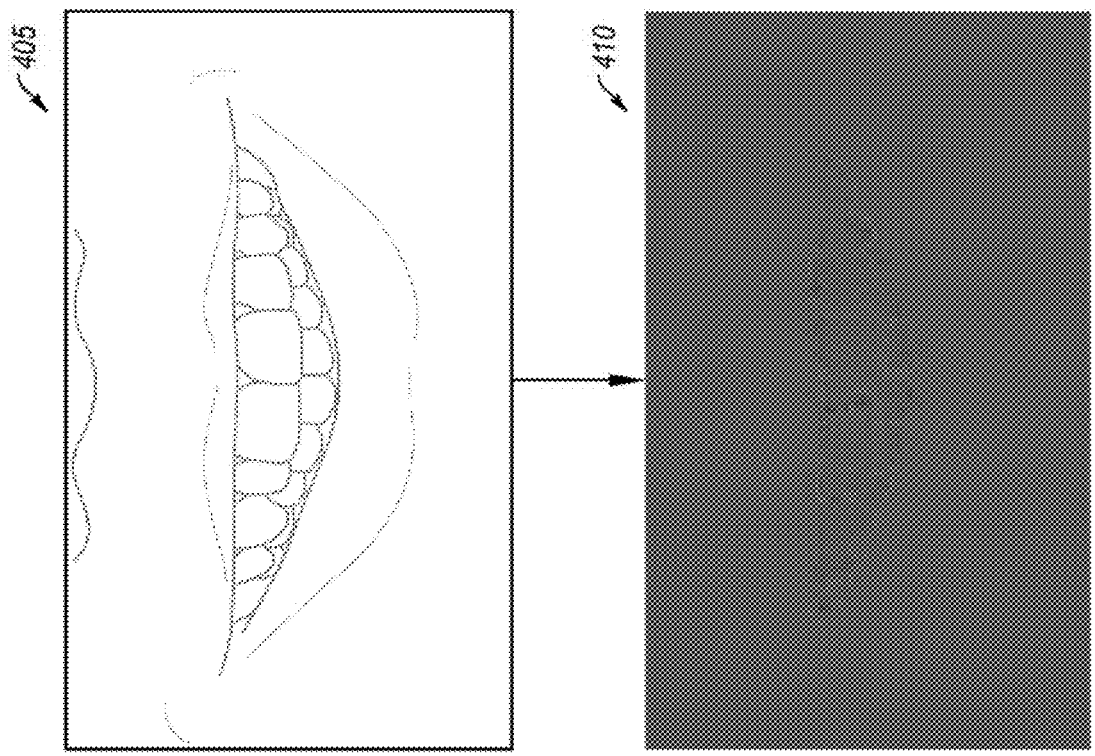
FIG. 4A illustrates an initial blurry image and a filtered version of the initial blurry image, in accordance with an embodiment.

FIG. 4A illustrates an initial blurry image 405 and a filtered version 410 of the initial blurry image, in accordance with an embodiment. The initial blurry image 405 was filtered according to the operation of block 220 of method 200. The sharpness metric computed for the filtered version 410 of the blurry image is 0.37, indicating that the ROI in the image 405 is blurry.

FIG. 4B illustrates an initial sharp image 415 and a filtered version 420 of the initial sharp image, in accordance with an embodiment. The initial sharp image 415 was filtered according to the operation of block 220 of method 200. The sharpness metric computed for the filtered version 420 of the sharp image is 26.14, indicating that the ROI of the image 415 is sharp.

Figure 5A:
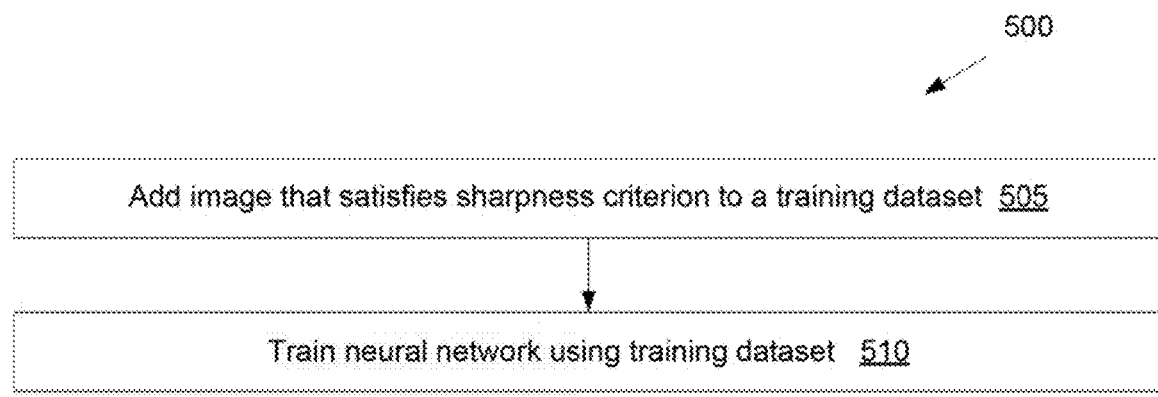
FIG. 5A illustrates a flow diagram for a method of performing operations using an image that was determined to satisfy a sharpness criterion, in accordance with an embodiment.

FIG. 5A illustrates a flow diagram for a method 500 of performing operations using an image that was determined to satisfy a sharpness criterion, in accordance with an embodiment. Method 500 may be performed at block 235 of method 200, for example.

At block 505 of method 500, processing logic adds an image that passed a quality test (e.g., the quality test of method 200) to a training dataset. Once the training dataset includes a sufficient number of high quality images, the training dataset may be used to train a neural network. For example, processing logic may be used to train a neural network to generate simulated images.

Figure 5B:
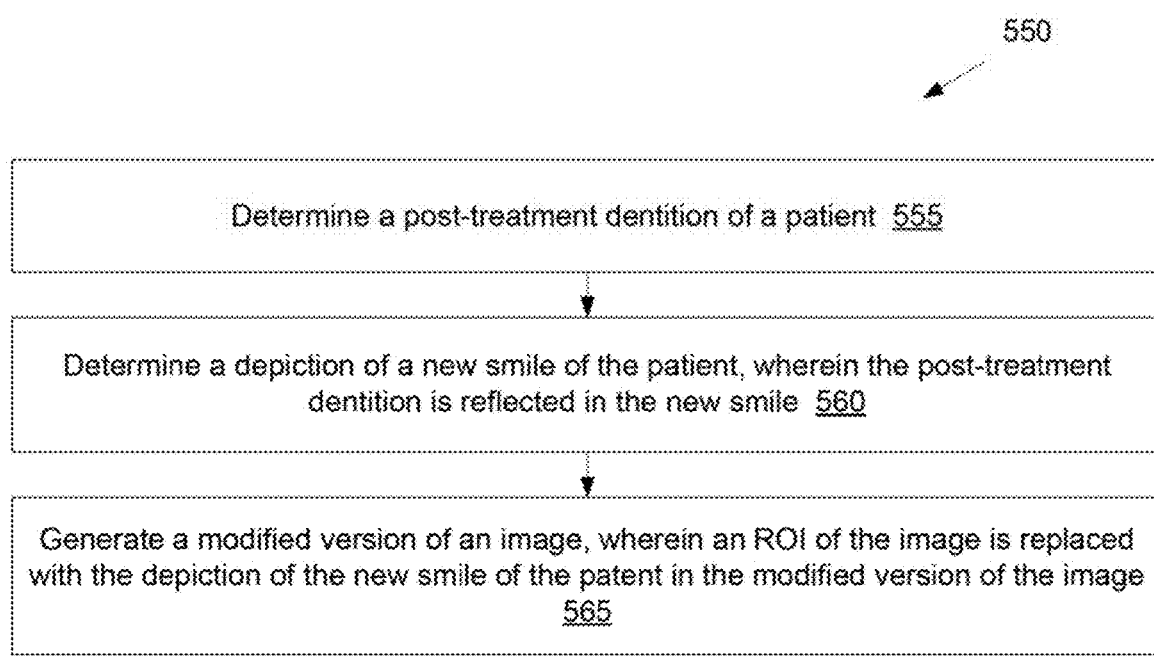
FIG. 5B illustrates a flow diagram for a method of performing operations using an image that was determined to satisfy a sharpness criterion, in accordance with an embodiment.

FIG. 5B illustrates a flow diagram for a method 550 of performing operations using an image that was determined to satisfy a sharpness criterion, in accordance with an embodiment. Method 550 may be performed at block 235 of method 200, for example.

At block 555 of method 550, processing logic determines a post treatment dentition of a patient. In one embodiment, the post treatment dentition of the patient is determined based on the patient's dentition as depicted in the image. For example, processing logic may determine a current dentition of the patient from the image, determine a treatment plan to adjust the dentition from the current dentition to a post-treatment dentition, and determine the post-treatment dentition from the treatment plan. At block 560, processing logic determines a depiction of a new smile of the patient based on the post-treatment dentition. This may include projecting a 3D model of the post-treatment dentition onto a plane defined by the image. The post treatment dentition may be reflected in the new smile of the patient.

At block 565, processing logic generates a modified version of the image, wherein an ROI of the image may be replaced with the depiction of the new smile of the patient in the modified version of the image. In one embodiment, the modified version of the image is generated using a GAN trained to take as an input data from an input image, and data of a post-treatment dentition, and to produce an output of a new image that includes a combination of data from the input image and data from the post-treatment dentition.

Figure 6:
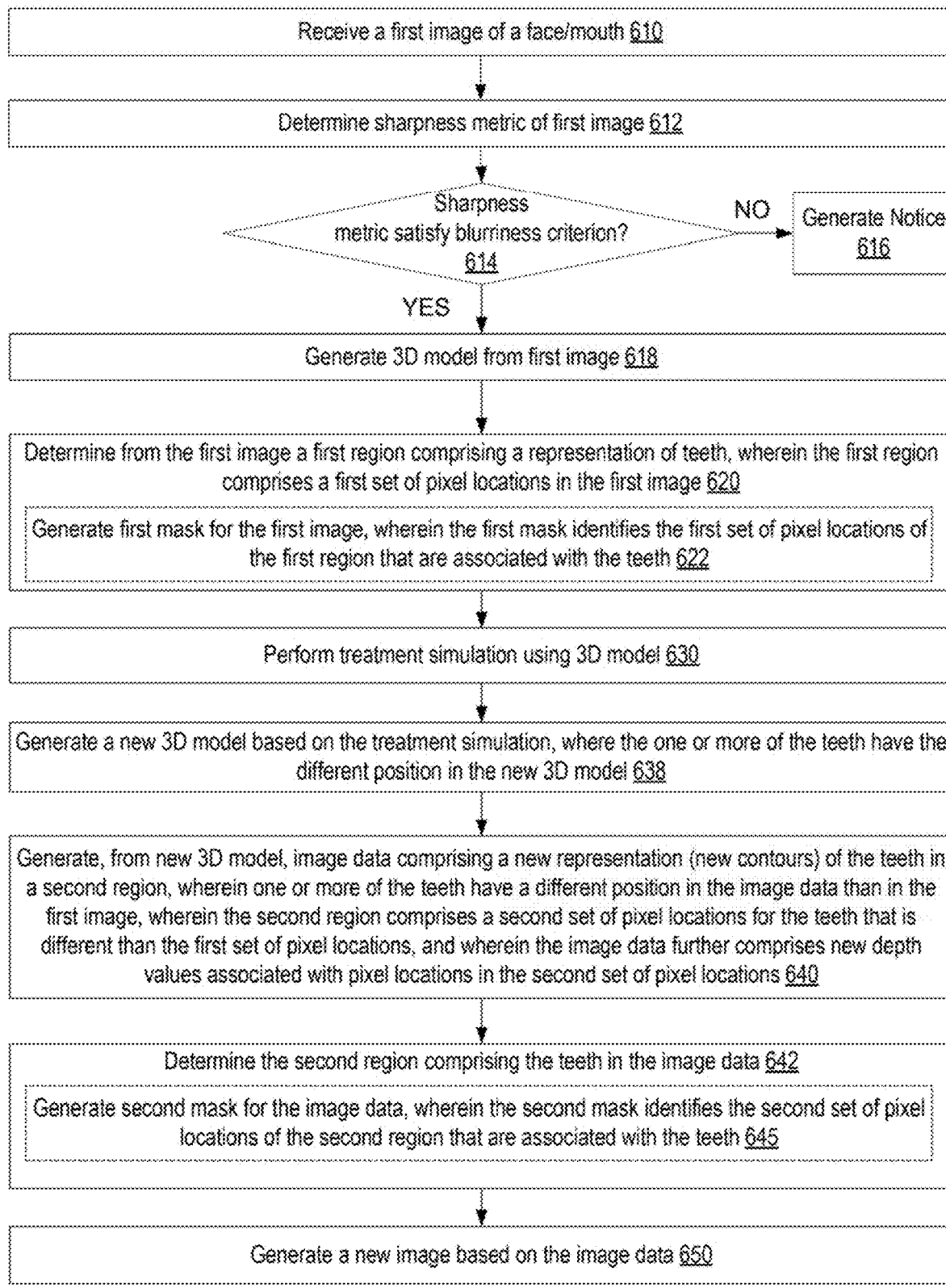
FIG. 6 illustrates a flow diagram for a method of generating a simulated image of a dental treatment outcome, in accordance with an embodiment.

FIG. 6 illustrates a flow diagram for a method 600 of generating a simulated image of a dental treatment outcome, in accordance with an embodiment. Method 600 may be performed by a processing logic that may comprise hardware (e.g., circuitry, dedicated logic, programmable logic, microcode, etc.), software (e.g., instructions run on a processing device), or a combination thereof. Various embodiments may be performed by a computing device 105 as described with reference to FIG. 1, for example.

At block 610 of method 600, processing logic receives a first image of a patient's face and/or mouth. The image may be an image of the patient smiling with their mouth open such that the patient's teeth and gingiva are showing. The first image may be a two-dimensional (2D) color image in embodiments.

At block 612, processing logic determines a sharpness metric for the first image. Processing logic may determine the sharpness metric using the techniques set forth herein above. For example, processing logic may perform operations of blocks 210-225 of method 200 to calculate the sharpness metric.

At block 614, processing logic determines whether the sharpness metric satisfies a sharpness criterion (e.g., whether the sharpness metric meets or exceeds a threshold). If the sharpness metric satisfies the sharpness criterion, the method continues to block 618. If the sharpness metric fails to satisfy the sharpness criterion, the method proceeds to block 616 and a notice is generated. The notice may indicate that the image was of insufficient image quality.

At block 618, processing logic may generate a 3D virtual model of the patient's dental arches (e.g., including teeth and/or gums) from the 2D image. Processing logic may determine whether there are any gaps between teeth. Such gaps may include gaps between adjacent teeth in the upper or lower dental arches and/or gaps between teeth in the upper arch and opposing teeth in the lower arch. If one or more gaps are identified, processing logic may perform inpainting to fill in any identified gaps between teeth. The inpainting includes changing the color values of pixel locations associated with the identified gaps with color values of pixel locations associated with nearby teeth.

At block 620, processing logic determines from the first image a first region comprising a representation of teeth. The first region may include a first set of pixel locations (e.g., x and y coordinates for pixel locations) in the first image. The first region may be determined using a first mask of the first image in some embodiments, where the first mask identifies the first set of pixel locations of the first region that are associated with the teeth. The first mask may additionally identify pixel locations of a second region of the first image that is associated with gingiva.

In one embodiment, processing logic generates the first mask for the first image at block 622. The first mask may be generated based on user input identifying the first region and/or the second region. For example, a user may trace an outline of the teeth and an outline of the gingiva in the first image, and the first mask may be generated based on the traced outlines. In one embodiment, the first mask is generated automatically using one or more trained neural network (e.g., such as a deep neural network). For example, a first neural network may process the first image to determine a bounding box around the teeth and gingiva. The image data within the bounding box may then be processed using a second trained neural network and/or one or more image processing algorithms to identify the gingiva and/or teeth within the bounding box. This data may then be used to automatically generate the first mask without user input.

Processing logic may also determine depth values associated with one or more pixel locations in the first region (in the first set of pixel locations). In one embodiment, the depth values are determined from the virtual 3D model generated at block 618. In one embodiment, processing logic generates a height map that assigns a height value (also referred to as a depth value) to each pixel location in the first set of pixel locations.

Processing logic may generate a first function for a first color channel based on intensities of the color channel at the pixel locations in the first set of pixel locations as identified in the first mask. Processing logic may also generate a second parametric function for a second color channel, a third parametric function for a third color channel, and/or one or more additional parametric functions for additional color channels (for color spaces that have more than three channels). Any color space may be used for the color channels associated with the parametric functions. For example, a red-blue-green (RGB) color space may be used, in which a first function may be generated for the red color channel, a second parametric function may be generated for the blue color channel and a third parametric function may be generated for the green color channel. A non-exhaustive list of other example color spaces that may be used include the hue, saturation, value (HSV) color space, the hue, saturation, luminance (HSL) color space, the YUV color space, the LAB color space, and the cyan, magenta, yellow black (CMYK) color space. In some embodiments, a LAB color space is used to determine the height map, and is then converted to another color space (e.g., RGB) after the height map is generated. The height map may then be used across different color channels (e.g., may be used for functions associated with different color channels).

The parametric functions may be global blurring functions that may be used to generate blurred representations of teeth. Parametric and/or non-parametric functions may be used for the global blurring functions. Some examples of polynomial functions that may be used include first order polynomial functions, second order polynomial functions, third order polynomial functions, fourth order polynomial functions, and so on. Other types of parametric functions that may be used include trigonometric functions, exponential functions, fractional powers, and so on. The parametric functions may be smooth functions that vary in the x direction and/or in the y direction. For example, the parametric functions may vary in only the x direction, in only the y direction, or in both the x direction and the y direction. Examples of non-parametric functions include splines. The parametric functions and non-parametric functions are global functions that incorporate some local information.

Each function may be initially set up with unsolved coefficients or constant functions as in the case of non-parametric functions. Processing logic may then perform linear regression or back-fitting to solve for the values of the coefficients (also referred to as parameters) or the non-parametric functions using the intensity values of the pixel locations indicated by the mask as well as the depth information associated with the pixel locations.

A similar process as set forth above may also be used to generate a set of blurring functions for gingiva. Alternatively, a Gaussian blurring function may be used for gingiva.

At block 630, processing logic performs treatment simulation using the generated virtual 3D model. At block 638, processing logic generates a new 3D model based on the treatment simulation. One or more teeth may have a different position in the new 3D model than they did in the initial 3D model.

In some embodiments, the operations of blocks 630 and 638 are performed before the operations of block 620. In further embodiments, a height map may be generated from the new virtual 3D model generated at block 638, and this height map may be used at block 620 rather than a height map associated with the original virtual 3D model generated from the first image. In one embodiment, the first virtual 3D model is compared to the new virtual 3D model to determine pixel locations that are associated with teeth in both virtual 3D models. In one embodiment, pixel locations that are not in both the first virtual 3D model and the new virtual 3D model are discarded from the height map. The height map that is then used to generate the first function (and additional functions) may be solved for using the updated height map in which one or more pixel locations have been discarded.

At block 640, processing logic generates, from the new 3D model, image data comprising a new representation (e.g., contours) of the teeth in a second region. One or more of the teeth may have a different position in the image data than in the first image. The second region may comprise a second set of pixel locations for the teeth that is different than the first set of pixel locations. The first and second region may overlap (e.g., some pixel locations in the first set of pixel locations may also be in the set of second pixel locations). The image data may further comprise new depth values associated with pixel locations in the second set of pixel locations. In one embodiment, the depth information is represented in a height map that is generated and that accompanies and/or is included in the image data. The height map may specify depth values for one or more pixel locations in the second set of pixel locations.

The image data may be or include a 2D sketch of post-treatment dentition, a projection of a 3D virtual model of a dental arch into a 2D plane, or other image data. A 3D virtual model may be oriented such that the mapping of the 3D virtual model into the 2D plane results in a simulated 2D sketch of the teeth and gingiva from a same perspective from which the first image was taken in some embodiments. The 3D virtual model may be included in a treatment plan, and may represent a final shape of the upper and/or lower dental arches of a patient after treatment is complete. Alternatively, or additionally, one or more 2D sketches of post-treatment dentition may be included in the treatment plan, with or without a 3D virtual model of the dental arch. Alternatively, or additionally, one or more 2D sketches may be generated from a 3D template. The image data may be a line drawing that includes contours of the teeth and gingiva, but that lacks color data for one or more regions (e.g., a region associated with the teeth). In one embodiment, generating the image data comprises projecting the 3D virtual model of an upper and/or lower dental arch into a 2D plane.

In one embodiment, generating the image data comprises inferring a likely 3D structure from the first image, matching the 3D structure to a template for a dental arch (e.g., a template with an ideal tooth arrangement), and then projecting the template into 2D. The 3D template may be selected from a set of available 3D templates, and the 3D template may be a template having a dental arch that most closely matches a dental arch in the first image. The 3D template may be oriented such that the mapping of the 3D template into the 2D plane results in a 2D sketch of teeth and gingiva from a same perspective from which the first image was taken in some embodiments.

At block 642, processing logic determines the second region comprising the teeth in the image data. The second region comprising the teeth may comprise a second set of pixel locations for the teeth that is different than the first set of pixel locations. For example, a treatment plan may call for the repositioning of one or more teeth of the patient. The first image may show those teeth in their initial positions and/or orientations (e.g., which may include a malocclusion), and the image data may show those teeth in their final positions and/or orientations (e.g., in which a previous malocclusion may have been treated).

In one embodiment, processing logic generates a second mask for the image data at block 645. Processing logic may also generate another mask for the gingiva for the image data. The second mask may identify the second set of pixel locations associated with the new positions and/or orientations of the teeth. The other mask for the gingiva may indicate pixel locations for the upper and/or lower gingiva post treatment. The second mask (and optionally other mask) may be generated in the same manner as discussed above with regards to the first mask. In some embodiments, a 3D virtual model or 3D template includes information identifying teeth and gingiva. In such an embodiment, the second mask and/or other mask may be generated based on the information in the virtual 3D model or 3D template identifying the teeth and/or the gingiva.

Processing logic may generate a blurred color representation of the teeth by applying the first function to the second set of pixel locations and the new depth values associated with the second set of pixel locations for the teeth that are identified in the second mask. This may include applying multiple different functions to pixel locations in the image data as specified in the second mask. For example, a first function for a first color channel may be applied to determine intensities or values of that first color channel for each pixel location associated with teeth, a second function for a second color channel may be applied to determine intensities or values of that second color channel for each pixel location associated with the teeth, and a third function for a third color channel may be applied to determine intensities or values of that third color channel for each pixel location associated with the teeth. The blurred color representation of the teeth may then include, for each pixel location associated with teeth in the image data, three different color values (or four different color channels for some color spaces), one for each color channel. A similar process may also be performed for the gingiva by applying one or more blurring functions to the pixel locations associated with the gingiva. Accordingly a single blurred color image may be generated that includes a blurred color representation of the teeth and a blurred color representation of the gingiva, where different blurring functions were used to generate the blurred color data for the teeth and gingiva.

At block 650, a new image is generated based on the image data (e.g., the sketch containing contours of the teeth and gingiva) and the blurred color image (e.g., which may contain a blurred color representation of the teeth and optionally a blurred color representation of the gingiva). A shape of the teeth in the new simulated image may be based on the image data and a color of the teeth (and optionally gingiva) may be based on the blurred color image containing the blurred color representation of the teeth and/or gingiva. In one embodiment, the new image is generated by inputting the image data and the blurred color image into an artificial neural network that has been trained to generate images from an input line drawing (sketch) and an input blurred color image. In one embodiment, the artificial neural network is a GAN. In one embodiment, the GAN is a picture to picture GAN.

Figure 7:
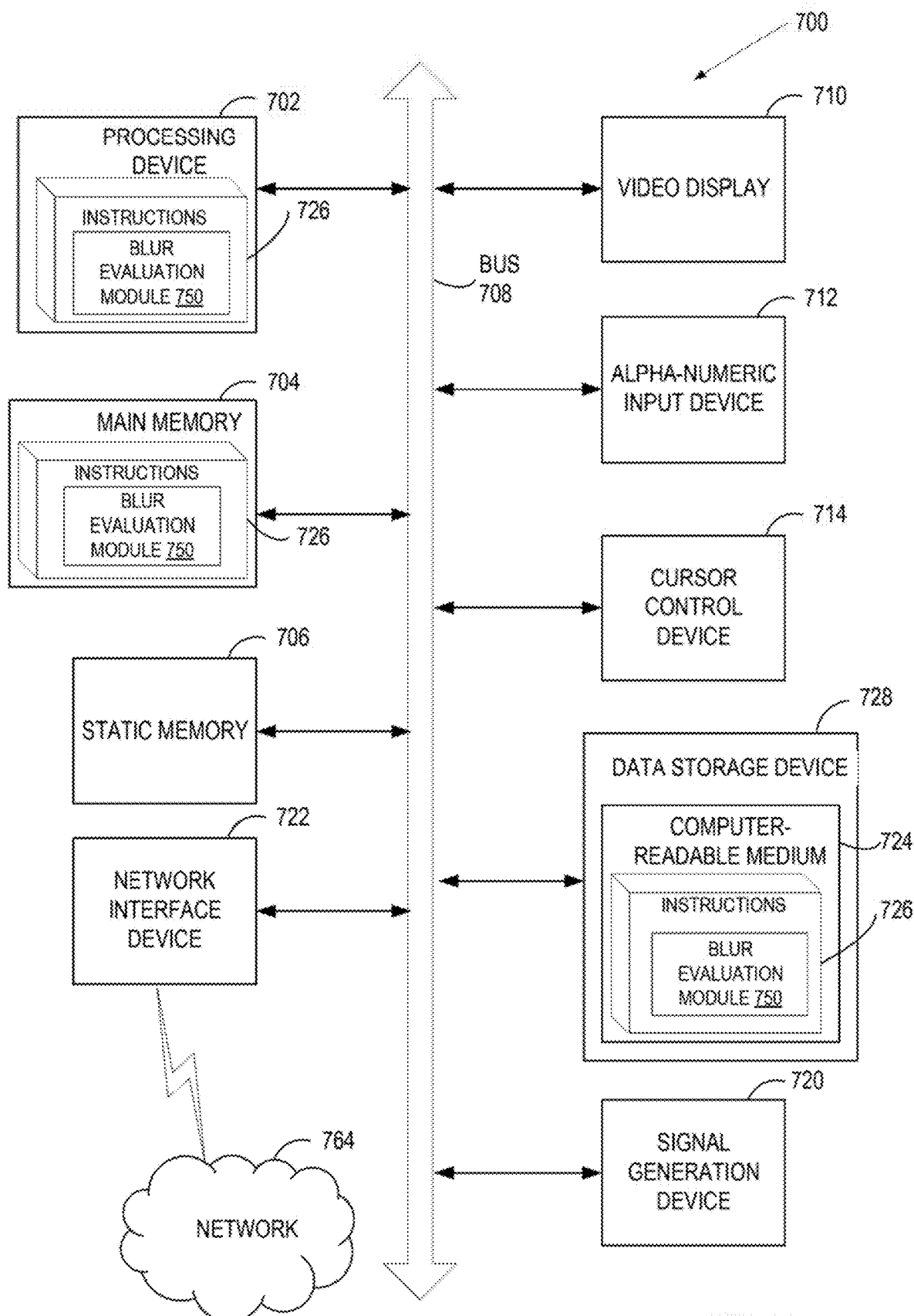
FIG. 7 illustrates a block diagram of an example computing device, in accordance with embodiments of the present disclosure.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 726) for performing operations and steps discussed herein.

The computing device 700 may further include a network interface device 722 for communicating with a network 764. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 may include a machine-readable storage medium (or more specifically a non-transitory computer-readable storage medium) 724 on which is stored one or more sets of instructions 726 embodying any one or more of the methodologies or functions described herein, such as instructions for a blur evaluation module 750, which may correspond to blur evaluation module 106 of FIG. 1. A non-transitory storage medium refers to a storage medium other than a carrier wave. The instructions 726 may also reside, completely or at least partially, within the main memory 704 and/or within the processing device 702 during execution thereof by the computer device 700, the main memory 704 and the processing device 702 also constituting computer-readable storage media.

The computer-readable storage medium 724 may also be used to store blur evaluation module 750, which may perform the operations described herein above. The computer readable storage medium 724 may also store a software library containing methods for the blur evaluation module 750. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method comprising:
   receiving an image of a face of a patient, the image including a depiction of lips of the patient;
   determining a region of interest in the image, wherein the region of interest comprises an area inside of the lips;
   applying a focus operator to pixels within the region of interest;
   calculating a sharpness metric for the region of interest using an output of the focus operator, wherein data for the pixels inside of the region of interest is used to calculate the sharpness metric, and wherein data for pixels of a second region that is outside of the region of interest is not used to calculate the sharpness metric;
   determining whether the sharpness metric satisfies a sharpness criterion; and
   performing one or more additional operations responsive to determining that the sharpness metric satisfies the sharpness criterion, wherein the one or more additional operations comprise generating a modified version of the image, wherein the region of interest is replaced with a depiction of a new smile of the patient in the modified version of the image.

2. The method of claim 1, wherein determining the region of interest comprises:
   processing the image using a trained machine learning model that has been trained to identify areas inside of lips in images of faces, wherein an output of the trained machine learning model is a probability map that identifies, for each pixel in the image, a probability that the pixel is within the region of interest; and
   generating a mask for the image of the patient, wherein each entry in the mask is associated with a specific pixel in the image and indicates for the specific pixel whether the specific pixel is inside of the region of interest or is outside of the region of interest.

3. The method of claim 2, wherein the trained machine learning model is an artificial neural network.

4. The method of claim 1, wherein determining the region of interest comprises:
   associating a bounding shape with the lips depicted in the image using a trained machine learning model, wherein the bounding shape comprises an object bounding the lips of the patient;
   determining, for each pixel in the image, whether the pixel is inside of the bounding shape or outside of the bounding shape, wherein pixels inside of the bounding shape are associated with the region of interest, and wherein pixels outside of the bounding shape are associated with the second region; and
   generating a mask for the image of the patient, wherein each entry in the mask is associated with a specific pixel in the image and indicates for the specific pixel whether the specific pixel is associated with the region of interest inside of the bounding shape or the second region outside of the bounding shape.

5. The method of claim 4, wherein the image is a two-dimensional image and the bounding shape is a rectangular bounding box or an oval bounding shape.

6. The method of claim 4, wherein performing the one or more additional operations further comprises:
   determining a post-treatment dentition of the patient; and
   determining the depiction of the new smile of the patient, wherein the post-treatment dentition is reflected in the new smile.

7. The method of claim 1, wherein applying the focus operator comprises:
   applying a Gaussian filter to the pixels within the region of interest; and
   applying a Laplacian filter to an output of the Gaussian filter.

8. The method of claim 7, wherein calculating the sharpness metric comprises:
   calculating a variance based on an output of the Laplacian filter.

9. The method of claim 7, wherein a sigma of the Gaussian filter is fixed, the method further comprising:
   performing at least one of cropping the image or resizing the image to cause a size of the region of interest to be within a predetermined size range prior to applying the focus operator.

10. The method of claim 1, wherein applying the focus operator to the pixels within the region of interest comprises applying the focus operator only to the pixels within the region of interest.

11. The method of claim 1, further comprising:
    converting pixels within the region of interest to grayscale prior to applying the focus operator to the pixels within the region of interest.

12. The method of claim 1, further comprising:
    identifying pixels comprising specular highlights in the image; and
    updating at least one of the image or a mask that identifies pixels in the region of interest to remove the specular highlights.

13. The method of claim 1, further comprising:
    determining an image class for the image of the face; and
    determining the sharpness criterion based at least in part on the image class.

14. The method of claim 1, further comprising:
    performing pixel intensity normalization on the image of the face prior to applying the focus operator to the pixels within the region of interest.

15. A non-transitory computer readable medium comprising instructions that, when executed by a processing device, cause the processing device to:
    receive an image of a face of a patient, the image including a depiction of lips of the patient;
    determine a region of interest in the image, wherein the region of interest comprises an area inside of the lips;
    apply a focus operator to pixels within the region of interest;
    calculate a sharpness metric for the region of interest using an output of the focus operator, wherein data for the pixels inside of the region of interest is used to calculate the sharpness metric, and wherein data for pixels of a second region that is outside of the region of interest is not used to calculate the sharpness metric;

determine whether the sharpness metric satisfies a sharpness criterion; and perform one or more additional operations responsive to determining that the sharpness metric satisfies the sharpness criterion, wherein performance of the one or more additional operations comprises generation of a modified version of the image, wherein the region of interest is replaced with a depiction of a new smile of the patient in the modified version of the image.

16. The non-transitory computer readable medium of claim 15, wherein determining the region of interest comprises:

processing the image using a trained machine learning model that has been trained to identify areas inside of lips in images of faces, wherein an output of the trained machine learning model is a probability map that identifies, for each pixel in the image, a probability that the pixel is within the region of interest; and generating a mask for the image of the patient, wherein each entry in the mask is associated with a specific pixel in the image and indicates for the specific pixel whether the specific pixel is inside of the region of interest or is outside of the region of interest.

17. The non-transitory computer readable medium of claim 16, wherein the trained machine learning model is an artificial neural network.

18. The non-transitory computer readable medium of claim 15, wherein determining the region of interest comprises:

associating a bounding shape with the lips depicted in the image using a trained machine learning model, wherein the bounding shape comprises an object bounding the lips of the patient;

determining, for each pixel in the image, whether the pixel is inside of the bounding shape or outside of the bounding shape, wherein pixels inside of the bounding shape are associated with the region of interest, and wherein pixels outside of the bounding shape are associated with the second region; and generating a mask for the image of the patient, wherein each entry in the mask is associated with a specific pixel in the image and indicates for the specific pixel whether the specific pixel is associated with the region of interest inside of the bounding shape or the second region outside of the bounding shape.

19. The non-transitory computer readable medium of claim 18, wherein the image is a two-dimensional image and the bounding shape is a rectangular bounding box or an oval bounding shape.

20. The non-transitory computer readable medium of claim 18, wherein performing the one or more additional operations further comprises:

determining a post-treatment dentition of the patient; and determining the depiction of the new smile of the patient, wherein the post-treatment dentition is reflected in the new smile.

21. The non-transitory computer readable medium of claim 15, wherein applying the focus operator comprises:

applying a Gaussian filter to the pixels within the region of interest; and applying a Laplacian filter to an output of the Gaussian filter.

22. The non-transitory computer readable medium of claim 21, wherein calculating the sharpness metric comprises:

calculating a variance based on an output of the Laplacian filter.

23. The non-transitory computer readable medium of claim 21, wherein a sigma size of the Gaussian filter is fixed, and wherein the instructions further cause the processing device to:

perform at least one of cropping the image or resizing the image to cause a size of the region of interest to be within a predetermined size range prior to applying the focus operator.

24. The non-transitory computer readable medium of claim 15, wherein applying the focus operator to the pixels within the region of interest comprises applying the focus operator only to the pixels within the region of interest.

25. The non-transitory computer readable medium of claim 15, wherein the instructions further cause the processing device to:

convert pixels within the region of interest to grayscale prior to applying the focus operator to the pixels within the region of interest.

26. The non-transitory computer readable medium of claim 15, wherein the instructions further cause the processing device to:

identify pixels comprising specular highlights in the image; and update at least one of the image or a mask that identifies pixels in the region of interest to remove the specular highlights.

27. The non-transitory computer readable medium of claim 15, wherein the instructions further cause the processing device to:

determine an image class for the image of the face; and determine the sharpness criterion based at least in part on the image class.

28. The non-transitory computer readable medium of claim 15, wherein the instructions further cause the processing device to:

perform pixel intensity normalization on the image of the face prior to applying the focus operator to the pixels within the region of interest.

29. A computing device comprising:

a memory to store instructions; and a processor operatively coupled to the memory, wherein execution of the instructions causes the processor to:

receive an image of a face of a patient, the image including a depiction of lips of the patient;

determine a region of interest in the image, wherein the region of interest comprises an area inside of the lips;

convert pixels within the region of interest to grayscale;

apply a focus operator to the pixels within the region of interest; and calculate a sharpness metric for the region of interest using an output of the focus operator, wherein data for pixels inside of the region of interest is used to calculate the sharpness metric, and wherein data for pixels of a second region that is outside of the region of interest is not used to calculate the sharpness metric;

determine whether the sharpness metric satisfies a sharpness criterion;

return an error responsive to a determination that the sharpness metric fails to satisfy the sharpness criterion; and responsive to a determination that the sharpness metric satisfies the sharpness criterion, generate a modified version of the image, wherein the region of interest is replaced with a depiction of a new smile of the patient in the modified version of the image.

* * * * *